(12) United States Patent
Gardner

(10) Patent No.: US 10,674,399 B2
(45) Date of Patent: Jun. 2, 2020

(54) CLUSTERED SYNCHRONIZATION WITHIN A DISTANCE-VECTOR WIRELESS NETWORK

(71) Applicant: MeshPlusPlus, Inc., Chicago, IL (US)

(72) Inventor: Daniel Gardner, Glenview, IL (US)

(73) Assignee: MeshPlusPlus, Inc., Chicago, IL (US)

( * ) Notice: Subject to any disclaimer, the term of this patent is extended or adjusted under 35 U.S.C. 154(b) by 5 days.

(21) Appl. No.: 16/013,398

(22) Filed: Jun. 20, 2018

(65) Prior Publication Data

US 2019/0394676 A1    Dec. 26, 2019

(51) Int. Cl.
 H04W 28/06   (2009.01)
 H04L 12/863  (2013.01)
 H02J 3/38    (2006.01)
 H04W 40/02   (2009.01)
 H04W 84/18   (2009.01)

(52) U.S. Cl.
 CPC ......... H04W 28/065 (2013.01); H04L 47/50 (2013.01); H02J 3/383 (2013.01); H04W 40/02 (2013.01); H04W 84/18 (2013.01)

(58) Field of Classification Search
None
See application file for complete search history.

(56) References Cited

U.S. PATENT DOCUMENTS

| | | | |
|---|---|---|---|
| 6,813,282 B1* | 11/2004 | Domon | H04L 12/40058 370/230 |
| 10,440,631 B1 | 10/2019 | Joshi et al. | |
| 2003/0012166 A1* | 1/2003 | Benveniste | H04W 56/00 370/338 |
| 2005/0111371 A1* | 5/2005 | Miura | H04L 1/1819 370/242 |
| 2007/0165673 A1* | 7/2007 | Huang | H04L 1/0057 370/474 |
| 2007/0195702 A1 | 8/2007 | Yuen et al. | |
| 2008/0049777 A1 | 2/2008 | Morrill et al. | |

(Continued)

OTHER PUBLICATIONS

B.A.T.M.A.N. Advanced Documentation Overview (2006-2016). Retrieved from the Internet at: URL:https://www.open-mesh.org/projects/batman-adv/wiki/Doc-overview.

(Continued)

*Primary Examiner* — Eunsook Choi

(74) *Attorney, Agent, or Firm* — Marshall, Gerstein & Borun LLP

(57) ABSTRACT

A network device operates as a node in a wireless mesh communication network. The device includes a wireless communication interface to couple the device to adjacent nodes via respective direct communication links in a phased repeating geometry. The device employs a phased synchronization within the wireless mesh communication network to transmit multiple packets and create overlapping network coverage of a geographic space. The device receives a first packet from a first node during a first phase, a second packet from a second node during a second phase, and applies an exclusive- or operation to the first packet and the second packet to generate a third packet, and sends the third packet to a first adjacent node and a second adjacent node during the third phase. In a second instance, the device applies an exclusive-or operation to a first phase packet and a second phase packet to retrieve a third phase packet.

20 Claims, 15 Drawing Sheets

(56) References Cited

U.S. PATENT DOCUMENTS

| | | |
|---|---|---|
| 2008/0279155 A1 | 11/2008 | Pratt, Jr. et al. |
| 2009/0086664 A1* | 4/2009 | Wu .................. H04W 40/02 |
| | | 370/328 |
| 2009/0138784 A1* | 5/2009 | Tamura ............ H03M 13/353 |
| | | 714/776 |
| 2009/0213728 A1* | 8/2009 | Chang ............... H04L 1/0057 |
| | | 370/216 |
| 2012/0099587 A1 | 4/2012 | Fan et al. |
| 2012/0201193 A1* | 8/2012 | Sugiyama ........... H04B 7/155 |
| | | 370/315 |
| 2013/0107764 A1* | 5/2013 | Zeger .................. H04L 5/16 |
| | | 370/280 |
| 2015/0358118 A1* | 12/2015 | Krigslund ........... H04W 40/02 |
| | | 370/254 |
| 2019/0102574 A1 | 4/2019 | Roberts et al. |

OTHER PUBLICATIONS

B.A.T.M.A.N. Multi-Link Optimizations (2006-2016). Retrieved from the Internet at: URL:https://www.open-mesh.org/projects/batman-adv/wiki/Multi-link-optimize.

B.A.T.M.A.N. NeworkCoding (2006-2016). Retrieved from the Internet at: URL:https://www.open-mesh.org/projects/batman-adv/wiki/NetworkCoding.

Hundeboll et al., "Inter-Flow Network Coding for Wireless Mesh Networks," Master Thesis in Networks and Distributed Systems, Aalborg University (2011). Retrieved from the Internet at: URL:https://downloads.open-mesh.org/batman/papers/batman-adv_network_coding.pdf.

Notice of Allowance issued in U.S. Appl. No. 16/013,394, dated Feb. 3, 2020.

\* cited by examiner

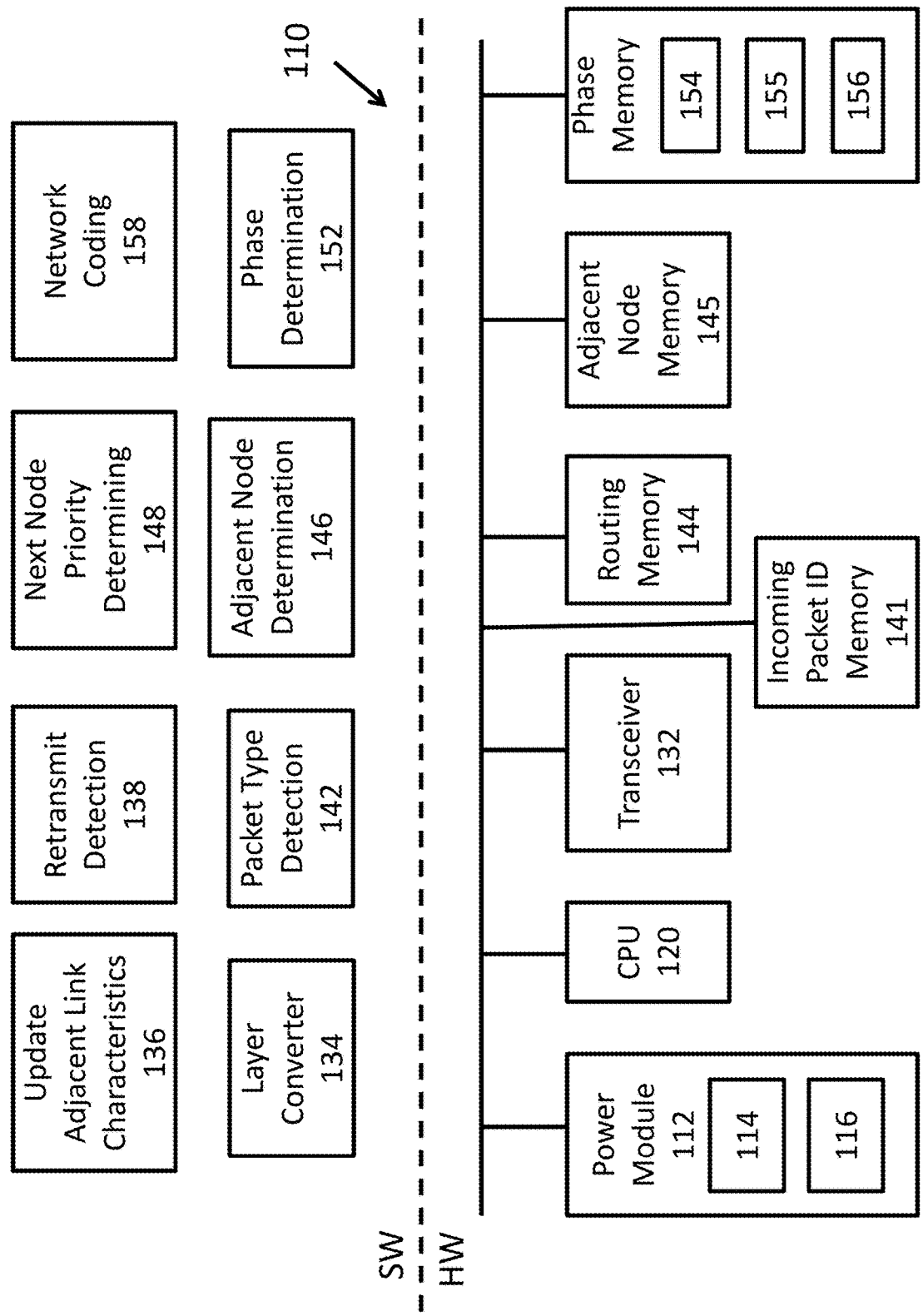

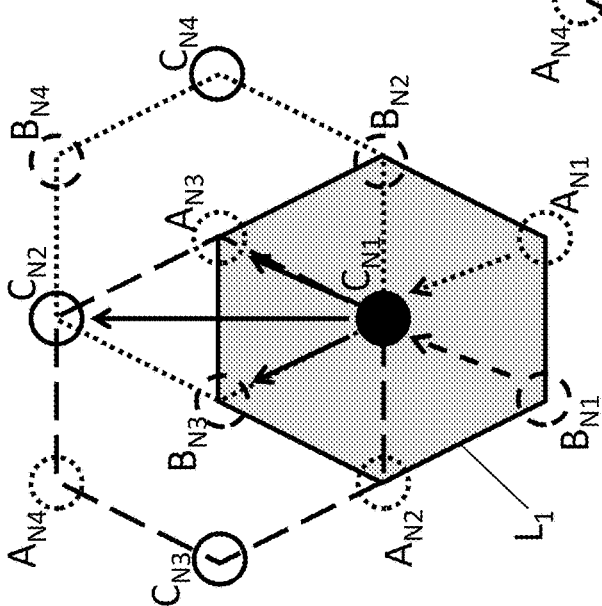
Fig. 3A.1
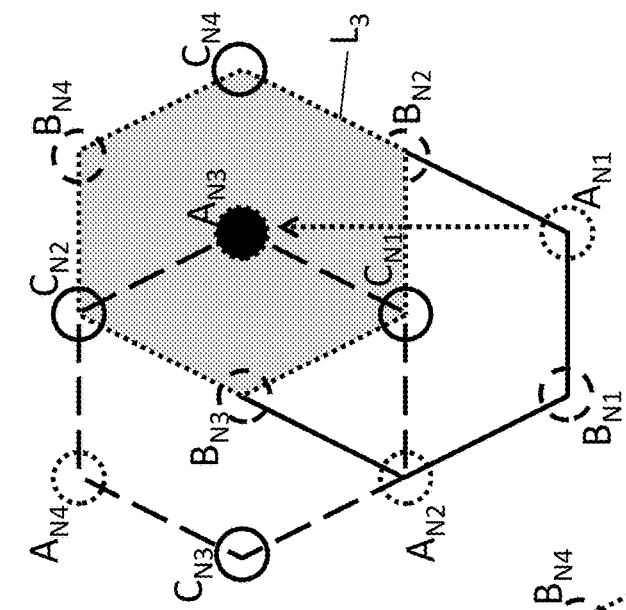
Fig. 3A.2
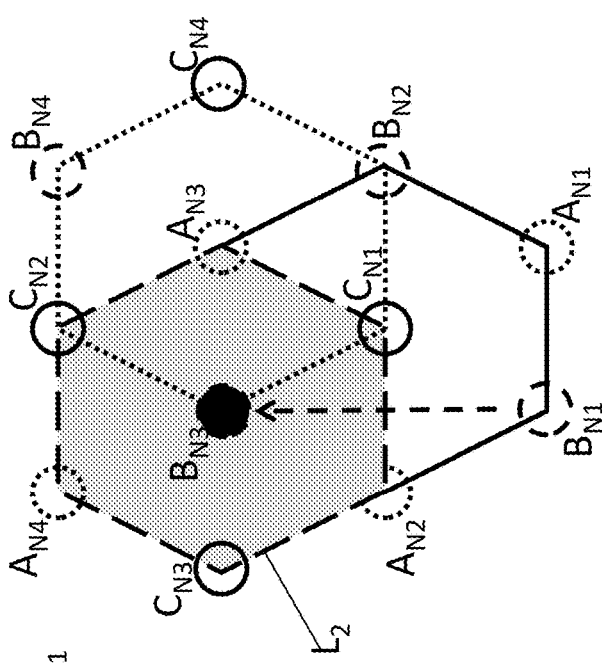
Fig. 3A.3

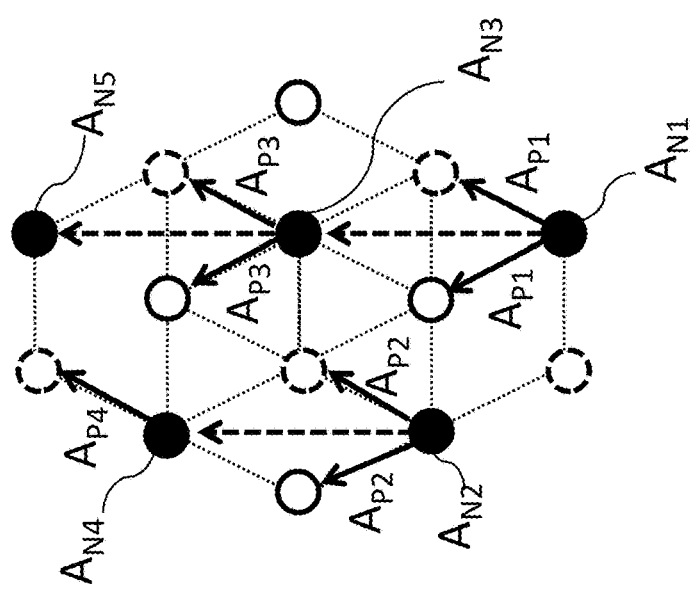
Fig. 3C.3
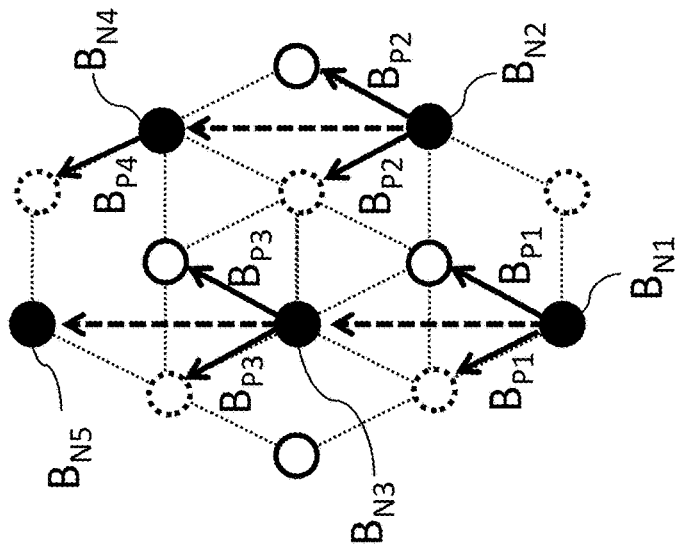
Fig. 3C.2
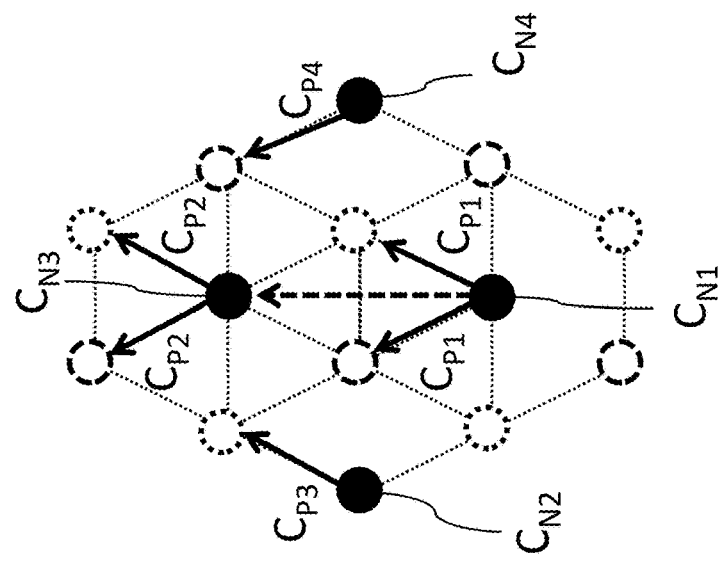
Fig. 3C.1

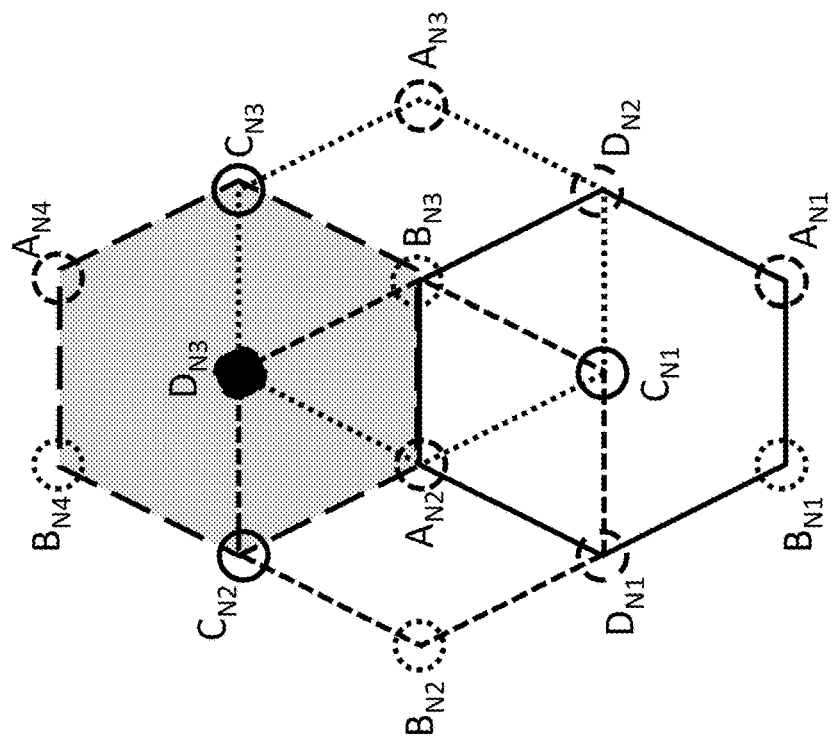
Fig. 4A.2
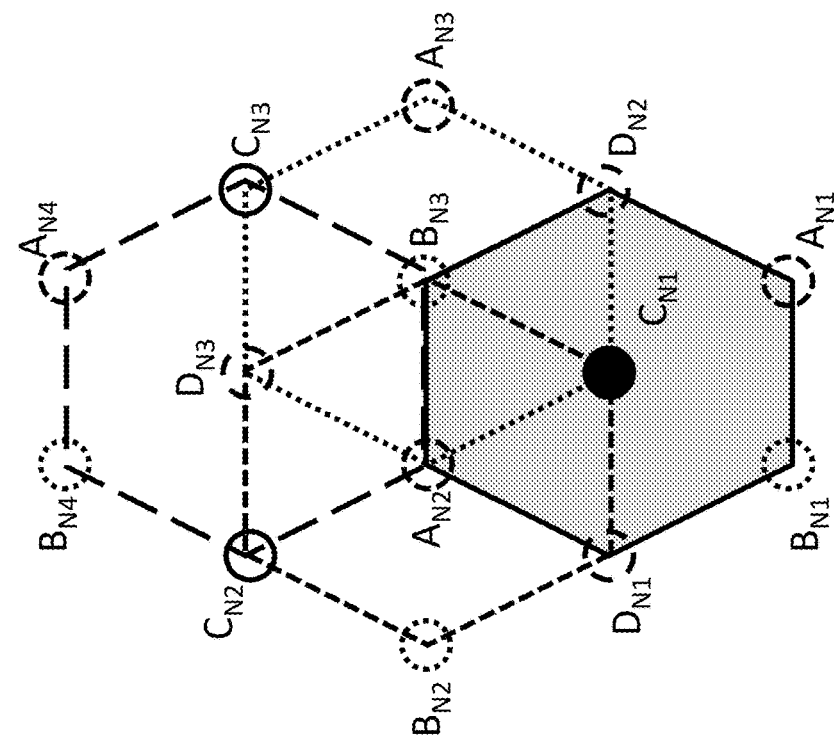
Fig. 4A.1

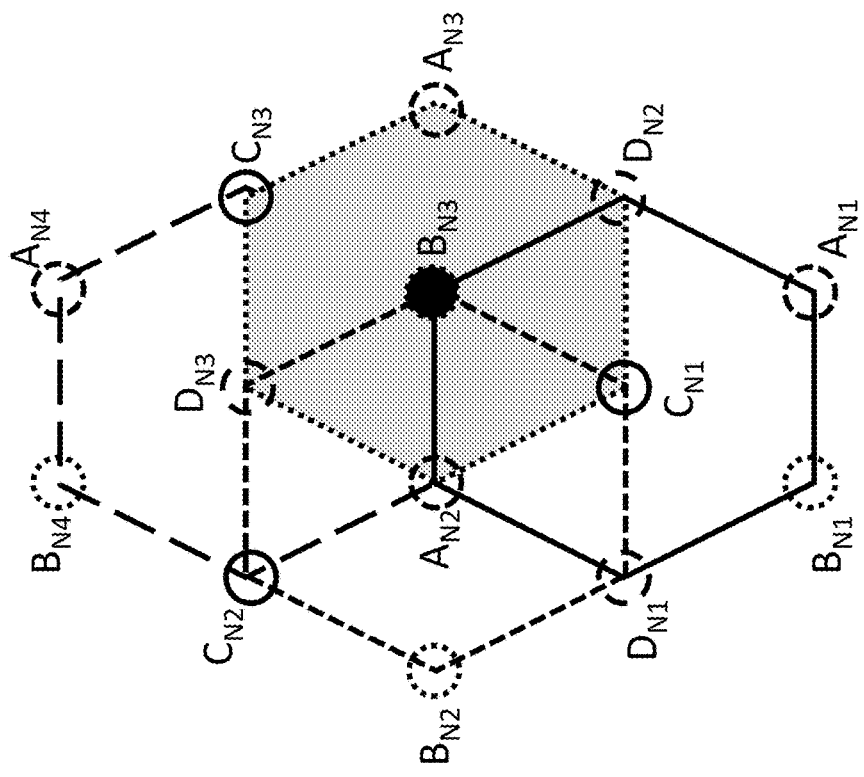
Fig. 4A.3
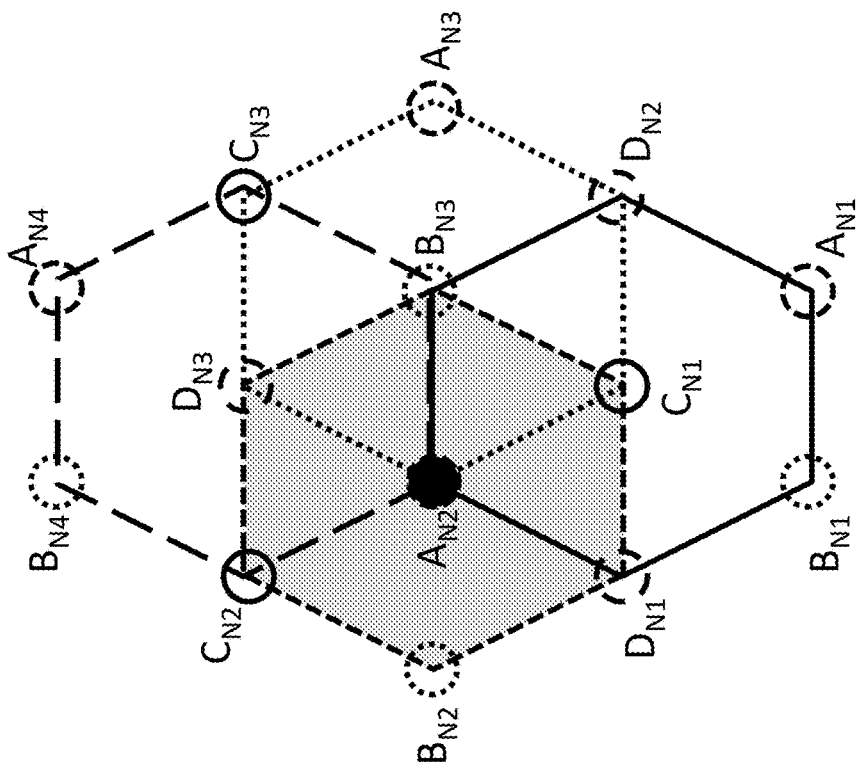
Fig. 4A.4

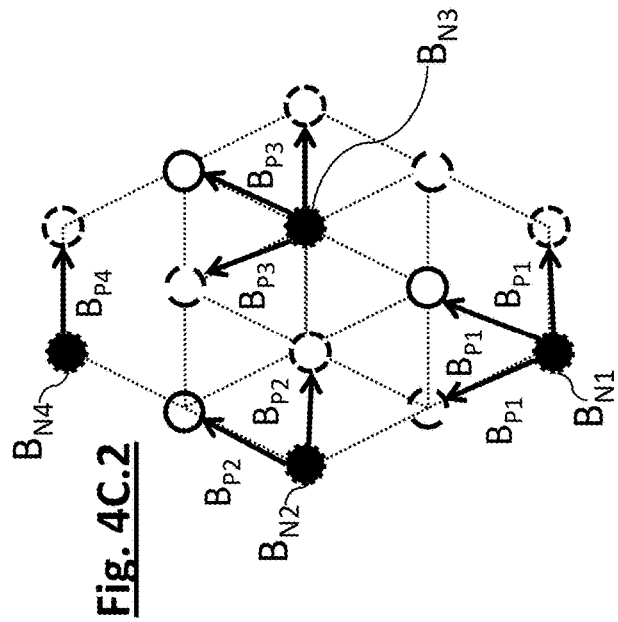
Fig. 4C.2
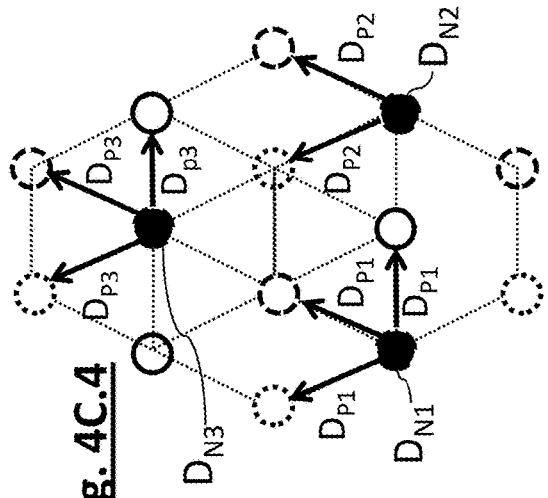
Fig. 4C.4
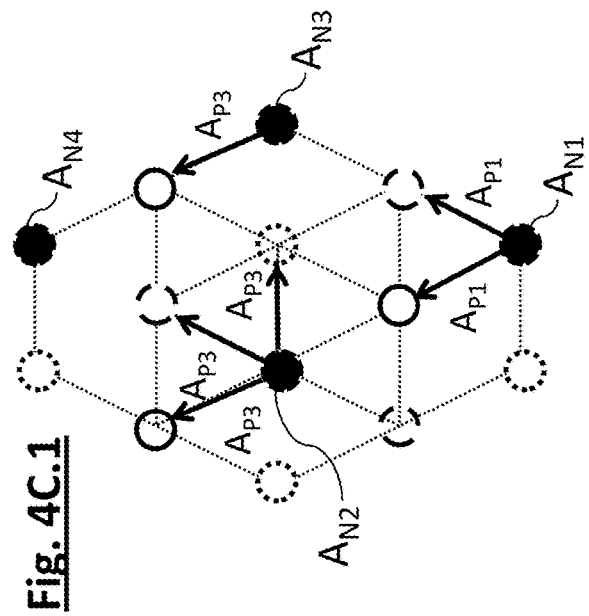
Fig. 4C.1
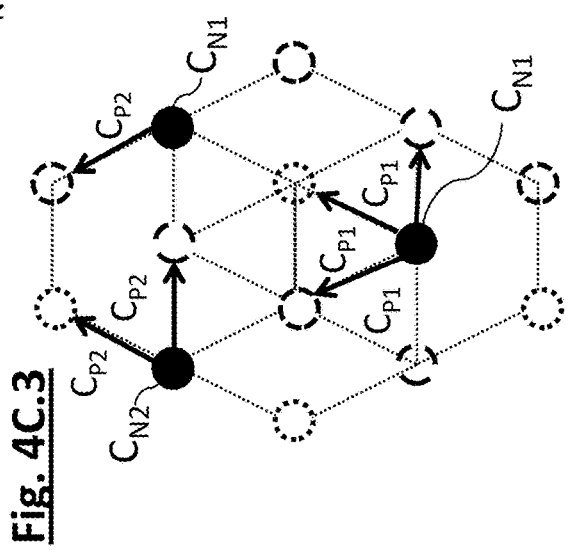
Fig. 4C.3

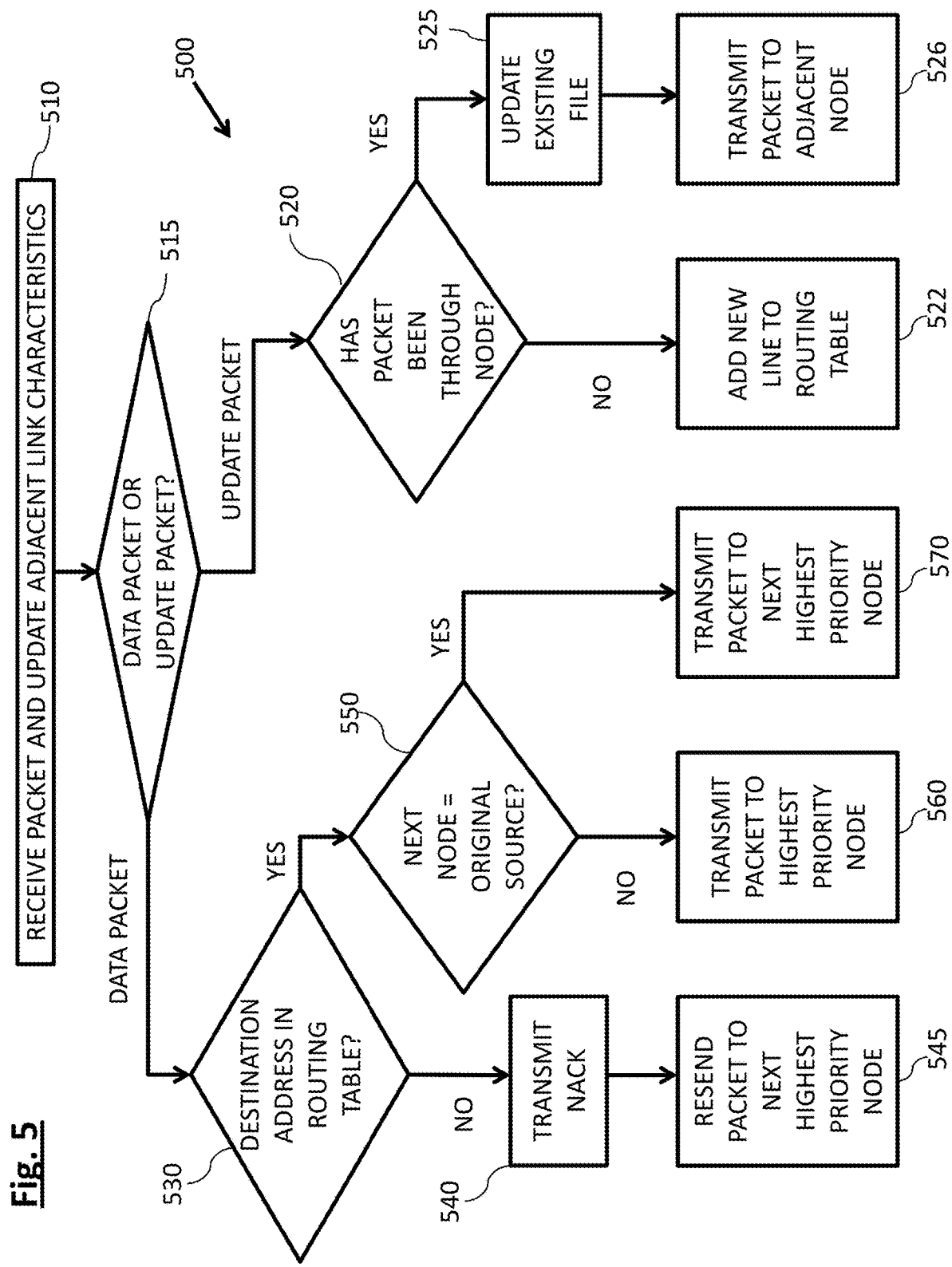

CLUSTERED SYNCHRONIZATION WITHIN A DISTANCE-VECTOR WIRELESS NETWORK

FIELD OF DISCLOSURE

The present disclosure generally relates to a wireless communication network. More particularly, the present invention disclosure relates to a device, system, and method for optimizing a wireless mesh network.

BACKGROUND

Wireless telecommunication technology has become essential in modern society. People rely on wireless networks in order to communicate, conduct business, enjoy entertainment, and optimize various aspects of day-to-day life. Wireless networks enable people to exchange information with others, regardless of location, in a lightning-fast manner. It is estimated that today, over 70% of all mobile communication flows over wireless local area networks (WLANs) that implement IEEE 802.11 standards, commonly referred to as "Wi-Fi™." While wireless networks offer flexibility and efficiency for end users, the hardware that supports these networks often is more limited than the hardware that supports wired communication networks.

Existing wireless network hardware, such as routers, often must be hardwired to a power source. This creates a multitude of problems because, first, a wireless network provider must anticipate its potential demand in order to determine the type and quantity of routers to implement in a space. Second, the wireless network provider must allot physical space to house the hardware, and such space must be proximate and/or capable of being connected to the power grid. This can create difficulties for developing wireless networks outside of an urban area because labor-intensive and expensive efforts, such as trenching power and telecommunications lines, must be undertaken to connect to the power grid. Generally speaking, setting up the infrastructure and the requisite cabling for a wireless network access point (AP) is expensive. Additionally, in some instances wireless network hardware must be placed in non-aesthetically appealing locations in order to connect to a power source and/or provide sufficient coverage. Ultimately, this can limit where wireless networks technology, such as Wi-Fi™, is available.

However, even when the necessary infrastructure exists, it can still be difficult for wireless networks to satisfy demand and provide adequate service for users. As the demand for wireless networks, such as Wi-Fi™, increases, so does the traffic within networks. Heavy traffic and increased usage of a wireless networks can cause delays and an increase in the time it takes to transmit and/or receive data, thereby eliminating some of the benefits of the technology. Without modifying/replacing existing hardware and/or adding new hardware, which as previously discussed typically entails substantial cost and effort, a wireless network is limited in regards to coverage and serviceability.

Mesh/Ad-Hoc networks can sometimes provide a solution to the obstacles posed by wireless network infrastructure. Mesh networks do not require cabling between routers, and typically employ either reactive or proactive routing. Under reactive routing protocols, an optimal route is determined by flooding a network with "feeler" packets, or otherwise determining an optimal path for a packet with informational payload, just prior to transmitting the packet. This approach generally is well-suited for highly dynamic networks, where routes cannot be accurately predicted. However, this routing technique often requires significant amounts of data to be stored on and transmitted between routers. Conversely, proactive routing protocols determine an entire route before transmission. However, proactive routing relies on historical data, which requires storing significant amounts of data that often is outdated, and thus the optimal route is not always chosen, which causes inefficiencies in the network. Mesh networks employing both reactive and proactive techniques can require greater amounts of electrical power, as compared to hardwired networks, in order to support the increased processing associated with transmitting large amounts of data throughout the network. Further, the transmissions of large amounts of data over a network can lead to inefficient routing and sizable losses. For example, existing mesh networks typically experience 40-60% throughput loss-per hop. In turn, this can limit the size, speed, and reliability of a network.

SUMMARY

The present application disclosure provides a device, system, and method for optimizing a wireless network.

In general, the present disclosure relates to aggregating data corresponding to one or more link characteristics for distributed routing decisions within a wireless mesh communication network. The wireless mesh network includes nodes that can update routing decisions in real time in view of various indications of performance of the wireless mesh network. The nodes do not need to report network updates to, or receive routing data from, a centralized system, and in this sense the nodes can make distributed routing decisions.

The present disclosure further relates to a phased synchronization within a wireless mesh communication network to transmit multiple packets and create overlapping network coverage of a geographic space.

In one embodiment, a wireless network device receives a first packet from a first node during a first phase, a second packet from a second node during a second phase, and applies an exclusive-or (XOR) operation to the first packet and the second packet to generate a third packet, and sends the third packet to a first adjacent node and a second adjacent node during the third phase.

In one embodiment, a method for synchronizing packet routing within a wireless mesh network comprises receiving, via a third node, a first packet transmitted from a first node during a first phase; receiving, via a third node, a second packet transmitted from a second node during a second phase; applying, at a third node during the third phase, an exclusive-or (XOR) operation to the first packet and the second packet to generate a third packet; and sending, during a third phase, the third packet to a first adjacent node and a second adjacent node, via respective direct links.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the device, system, and methods disclosed herein. It should be understood that each figure depicts an aspect of a particular aspect of the disclosed device, systems, and/or methods, and that each of the figures is intended to accord with a possible aspect thereof. Further, wherever possible, the following description refers to the reference numerals included in the following figures, in which features depicted in multiple figures are designated with consistent reference numerals.

However, it should be understood that the present embodiments are not limited to the precise arrangements and instrumentalities shown, wherein:

FIG. 1B illustrates hardware and software components of an embodiment of a wireless communication network routing device.

FIG. 3A.1 illustrates an embodiment of a first cluster of a communication network.

FIG. 3A.2 illustrates an embodiment of a second cluster of a communication network.

FIG. 3A.3 illustrates an embodiment of a third cluster of a communication network.

FIG. 3C.1 illustrates an embodiment of a first phase of a communication network.

FIG. 3C.2 illustrates an embodiment of a second phase of a communication network.

FIG. 3C.3 illustrates an embodiment of a third phase of a communication network.

FIG. 4A.1 illustrates an embodiment of a first cluster of a four-phase communication network.

FIG. 4A.2 illustrates an embodiment of a second cluster of a four-phase communication network.

FIG. 4A.3 illustrates an embodiment of a third cluster of a four-phase communication network.

FIG. 4A.4 illustrates an embodiment of a fourth cluster of a four-phase communication network.

FIG. 4C.1 illustrates an embodiment of a first phase of a communication network.

FIG. 4C.2 illustrates an embodiment of a second phase of a communication network.

FIG. 4C.3 illustrates an embodiment of a third phase of a communication network.

FIG. 4C.4 illustrates an embodiment of a fourth phase of a communication network.

FIG. 5 illustrates a method for optimized transmission of a packet through a wireless communication network.

DETAILED DESCRIPTION

Overview

Figure 1A:
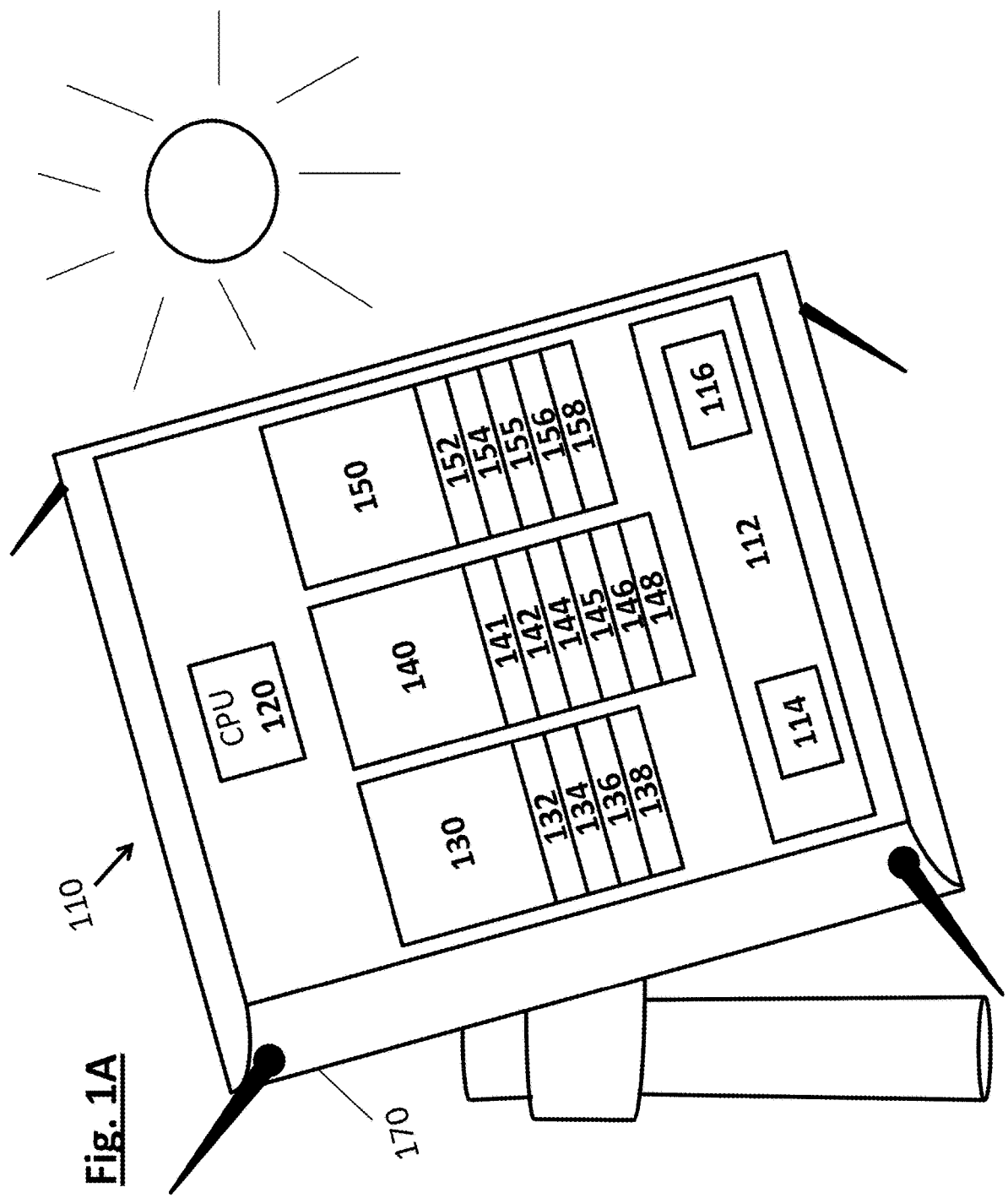
FIG. 1A illustrates a block diagram of an embodiment of a wireless communication network routing device.

The embodiments described herein relate to, inter alia, systems and methods for providing improved wireless network speed, reliability, and coverage.

Eliminating the need for wireless network hardware to connect to a power grid creates tremendous flexibility for establishing and maintaining a wireless network. Powering wireless network hardware using solar power technology, instead of relying on the power grid, enables a wireless network to be truly wireless. However, generating enough solar energy to power to meet the demand of existing wireless routers, such as Mesh/Ad Hoc networks, would require relatively large solar panels and sizeable, as well as expensive, supporting infrastructure. Accordingly, some of the shortcomings of existing hardwired wireless networks still would not be resolved by using solar-powered wireless network hardware. Further, the large solar panels and structural support equipment still would limit where the access point, such as a wireless router, could be located.

The present disclosure relates to modifying how a wireless mesh network is configured in order to reduce power consumption so that smaller solar-powered and/or battery-powered hardware solutions are viable for powering a mesh network routing device. The use of small solar-powered solutions increases the flexibility and scalability of a wireless network, and does so at a fraction of the cost of high-powered routing hardware. The systems and methods described herein enable low-cost, reliable wireless networks to be set up in a variety of environments, including those previously deemed unsuitable. Examples of these environments include, but are not limited to, public spaces, education environments (e.g., college campuses and buildings), large scale events (e.g., festivals, concerts, sporting events, etc.), outdoor resorts/compounds, emerging markets (e.g., developing countries, rural environments, and other environments lacking technological infrastructure), agricultural, constructions, offshore (e.g., oil and gas rigs), shipping ports, mining environments, and/or any other physical environment that may be exposed to a solar source (e.g., the sun). Accordingly, the embodiments described herein relate to optimizing network routing for a fully-wireless network. Under existing methods throughput loss-per-hop is 40-60%. However, some embodiments of the device, system, and methods described herein can reduce the throughput loss-per-hop to approximately 20% and possibly even lower.

Distance-vector routing and link-state routing are the two main types of routing protocols used in packet switching communication networks. Distance-vector routing is a protocol for determining the best route to transmit a data packet based on the number of nodes/routers a packet must traverse in order to reach its final destination. In traditional distance-vector routing protocols, each router/node shares its own routing table with other nodes to determine the best next node (to receive a packet), and thus a node is aware of the entire network when making a routing decision. Link-state routing involves every router in the network receiving a map of the network showing which nodes are in communication with each other. Link-state routing protocol uses only its own local copy of the map, without communicating with any other nodes to make routing decisions. Thus, both packet routing techniques have a tendency to be impeded as a result of superfluous and/or outdated information, consequently overloading and/or underutilizing many nodes within a communication network.

The present disclosure offers an improvement over known distance-vector routing and link-state routing techniques by using a plurality of link characteristics (i.e., information corresponding to a node within a network and/or information about the connection between multiple nodes within the network) corresponding to just the nodes adjacent to the routing device, to create a priority system for determining the next node to receive a packet. Implementing a priority system for routing optimizes, or at least improves efficiency of, the network by distributing packets in a manner that makes use of all adjacent nodes, thereby preventing overloading or underutilizing any nodes. Additionally, the systems and methods described herein receive relatively frequent updates corresponding to just adjacent nodes, as opposed to relatively infrequent updates of all nodes/the entire network map, thereby ensuring the information used by the device is up-to-date. Aggregating link characteristics of only adjacent nodes results in more accurate and efficient routing, and requires that less overhead data be stored on a device because the device need not store data for every node in the network. Additionally, the device does not increase the data size of link characteristics, but instead just updates/replaces existing link characteristics with any updated/new data. Further, routing based on a plurality of link characteristics (e.g., hops, delay, packet loss, packet window, throughput, encoding, etc.), as opposed to just one (e.g., distance/hops), improves routing decision making.

The present disclosure offers an improvement over known routing techniques by using network coding and phased transmissions to transmit multiple packets and create overlapping network coverage of a geographic space. The term phase synchronization refers to assigning a specific phase to each node, and causing a node to transmit a packet only during its own assigned/determined phase. The systems and methods described herein utilize the Exclusive-or logical function (i.e. an output is only true when the inputs differ) to transmit two or more packets because the Exclusive-or (hereinafter "XOR") can be easily reversed, by XORing a packet with a secondary packet, to uncover the intended message. The system and methods described herein rely on the synchronized nature of each phase (e.g., a first packet received during a first phase, second packet received during a second phase, etc.) in order to recognize which packets to perform an XOR operation on in order to properly retrieve an intended message. The use of phased synchronization enables optimized routing within a network by eliminating the need for a device to transmit feeler packets because a node understand to only attempt to transmit a packet during its own determined phase. Further, assigning each node in a network a designated phase prevents overloading/underutilizing nodes, and thus expands/improves network reliability, speed, and coverage.

Example Implementation of a Network Device

FIG. 1A illustrates a block diagram of an embodiment of a wireless communication network routing device. The wireless communication network routing device 110 (hereinafter "the network device" or simply "the device") may include a power module 112, a central processing unit (CPU) 120, a communication module 130, a memory module 140, a phase synchronization module 150, and a protective housing 170. In operation, the device 110 may be configured to receive, process, analyze, update, store, and/or transmit packets containing and/or corresponding to one or more data, signals, messages, other devices, routes, or communication networks in furtherance of facilitating an adaptable wireless communication network. As discussed in more detail below, the device 110 may be configured to aggregate and store in the memory module 140 characteristics of links via which the device 110 is communicates with other nodes (i.e., other devices, terminals, etc.) within a wireless communication network.

Although the device 110 is shown in FIG. 1A to include one CPU 120, one power module 112 (including one primary power supply 114 and one local reserve power supply 116), one communication module 130 (including one transceiver 132, one data layer converter 134, one link characteristics update program memory 136, and one retransmit detection program memory storage 138), one memory module 140 (including one incoming packet ID memory storage 141, one packet type detection program memory 142, one routing memory storage 144, one adjacent node memory storage 145, one adjacent node determination program memory 146, and one next node priority determining program memory 148), one phase synchronization module 150 (including one phase determination program memory 152, one N-phase memory storage 154, one (N+1)-phase memory storage 155, one (N+2)-phase memory storage 156, and one network coding program memory 158), and one protective housing 170, it should be understood that different numbers of each may be utilized. For example, the device 110 may include a plurality of transceivers 132, all of which may be in communication with the CPU 120 and the various memory storages. Furthermore, the storage or processing performed by the CPU 120 may be distributed among a plurality of processors and memory within the device 110.

FIG. 1B illustrates hardware and software components of an embodiment of a wireless communication network routing device 110. The software components of the device 110 are implemented using the hardware components of the device 110. As illustrated, in some embodiments the data layer converter 134, link characteristics update program 136, retransmit detection program 138, packet type detection program 142, adjacent node determination program memory 146, next node priority determining program 148, phase determination program memory 152, and the network coding program memory 158 are software instructions, stored in a memory storage unit, that are configured to be executed by the CPU 120. In some embodiments, the power module 112 (the primary power supply 114 and the local reserve power supply 116), the CPU 120, the transceiver 132, the routing memory storage 140, the packet ID memory storage 141, the adjacent node memory storage 145, the N-phase memory storage 154, the (N+1)-phase memory storage 155, and the (N+2)-phase memory storage 156 are hardware components. More generally, the functionality of these components can be implemented in and distributed between hardware, software, firmware, or any suitable combination thereof.

In some embodiments, the device 110 is a network router dedicated to routing data between from devices that originate data and to devices that consume data. The device 110 however in general may be any suitable device such as a router, mobile computing device, mobile device (e.g., smartphone, tablet, laptop, phablet, netbook, notebook, pager, personal digital assistant (PDA), wearable computing device, smart glasses, smart watch or bracelet, etc.), or other computing device configured to facilitate data exchange within a wired and/or wireless network. The device 110 may further include a number of software applications stored in the communication module 130, memory module 140, and/or phase synchronization module 150. In some embodiments the aforementioned modules may all be stored as software modules within the same program memory. The various software applications on the device 110 may include specific programs, routines, or scripts for performing processing functions associated with the methods and functions described herein. Additionally, the various software applications on the device 110 may include general-purpose software applications for data processing, database management, data analysis, network communication, web server operation, or other functions described herein or typically performed by a server. The various software applications may be executed by the CPU 120 or on different processors. Additionally or alternatively, the software applications may interact with various hardware modules that may be installed within, physically coupled to, or otherwise connected to the device 110. Such modules may implement part or all of the various methods/techniques/functions discussed herein or other related embodiments.

The memory units discussed herein may include one or more types of non-transitory computer-readable memory, including volatile memory (e.g., a random access memory (RAM), DRAM, SRAM, etc.), non-volatile memory (ROM, EEPROM, battery-backed RAM, FLASH, etc.), and/or secondary storage (e.g., hard drive, solid state, etc.). The components of the communication module 130, the memory module 140, and/or the phase synchronization module 150 may be configured to store instructions executable by the CPU 120. These instructions may include machine readable instructions that, when executed by CPU 120, cause the CPU 120 to perform various acts and/or the device 110 to operate in a specific manner.

The power module 112 is configured to supply electrical power to the device 110 and its components (e.g., the CPU 120, the communication module 130, memory module 140, and the phase synchronization module 150). The power module 112 may include a primary power supply 114 and a local reserve power supply 116. In some embodiments, the primary power supply 114 may be a solar-powered unit (e.g., a solar panel), a wind-powered unit (e.g., a wind turbine), a battery, a capacitor, another source of electrical power, and/or any combination thereof. The local reserve power supply 116 may be configured to provide power to the device 110 in the event that the primary power supply 114 is not receiving power from a power source or otherwise cannot supply power to the device 110. Examples of the local reserve power supply 116 include, but are not limited to, a battery, capacitor, a hardwired connection to a power grid, another source of electrical power, and/or any combination thereof. For example, in an embodiment in which the primary power supply 114 is a solar panel and the local reserve power supply 116 is a battery, when the solar panel cannot generate and/or store a sufficient amount of power because there is insufficient sunlight to power the device 110 and/or the device 110 has consumed power previously stored by the solar panel, the battery may provide power to the device 110, and various other components, as necessary. It should be appreciated that the power module 112 may be contained within the device 110, affixed to the exterior of the device 110, and/or otherwise in a hardwired connection to the device 110. In some embodiments, the power module 112, or any of its components, may be removable, rechargeable, and/or replaceable. For example, in an embodiment in which the power module 112 includes a battery, the battery may be configured to be removed, recharged, and/or replaced. In some embodiments, the power module 112 may be removed and coupled to an external power source (e.g., a battery charger) in order to recharge the power module 112, or one of its components. In some embodiments, the device 110 may be fully battery-powered.

The CPU 120 is configured to control the functionality of the device 110. The CPU 120 may be configured to execute software instructions to cause data to be transmitted, retrieved, stored, analyzed, compared, updated, and/or otherwise accessed in furtherance of the functionality described herein. The CPU 120 may be configured to communicate with the power module 112, the communication module 130, routing module 140, the phase synchronization module 150, and/or the respective components of these modules. The CPU 120 may be configured to control the power module 112. For example, the CPU 120 may select whether the primary power supply 114 and/or the local reserve power supply 116 provide power to the device 110. In some embodiments, for example, the CPU 120 may be configured to cause the one or more local reserve power supplies to begin supplying power to the device 110. The CPU 120 may be configured to cause the communication module 130 to convert, transmit, and/or receive data. The CPU 120 may be configured to read, analyze, and/or store data housed in one or more components of the communication module 130, the memory module 140, and/or the phase synchronization module 150. Although FIGS. 1A, 1B, 1C, and 1D illustrate device 110 as implementing a single CPU 120 for brevity, device 110 in general may include any suitable number and type of general-purpose processing hardware (e.g., a CPU) or special-purpose processing hardware (e.g., an ASIC).

With continued reference to FIG. 1B, the communication module 130 is configured to receive, transmit, and/or convert packets, or data contained in a packet, corresponding to a wireless communication network. The communication module 130 may include a transceiver 132, a data layer converter 134, a link characteristics update program memory storage 136, and retransmit detection program memory storage 138. The transceiver 132 is configured to receive and transmit packets, and may be designed to send and receive information/data according to predetermined specifications, such as a dedicated short-range communication (DSRC) channel, wireless telephony, Wi-Fi™, or other existing or later-developed communications protocols. In some embodiments, the transceiver 132 may comprise separate components configured to receive and transmit (e.g., a receive buffer and a transmit buffer). The transceiver 132 may receive a packet from a source node (i.e., a node that transmitted a packet to the device 110). The transceiver 132 may transmit a packet to a recipient node (i.e., a node that receives a packet, signal, message, and/or type of data from the device 110). The data layer converter 134 is configured to convert data between different layers. In some embodiments, the data converter 134 is configured to convert a received packet/data from the physical layer (layer 1) to the link layer (layer 2). In some embodiments or scenarios, the data converter 134 is converts data/packet from the link layer (layer 2) to the physical layer (layer 1) before transmitting the data/packet to another device/node. In some embodiments, the data converter 134 may comprise a plurality of converters (e.g., a first converter to convert from the physical layer to the link layer, a second converter to convert from the link layer to the physical layer, etc.).

The link characteristics update program memory 136 stores program instructions for updating data corresponding to one or more link characteristics stored in the adjacent node memory storage 145. The retransmit detection program memory storage 138 is configured to store program instructions for comparing data contained in the packet with data stored on the device 110 (e.g., in the routing memory storage 144, the adjacent node memory storage 145, etc.). Data corresponding to the link characteristics includes, but is not limited to, number of hops/jumps between nodes, delay, packet loss, packet window, throughput, and/or encoding. In some embodiments, data corresponding to the link characteristic may be representative of a maximum, minimum, mean, and/or median value of a link characteristic. Depending on the embodiment, data corresponding to the link characteristics may correspond to the entire network or only a portion of the network (e.g., one or more neighbor nodes). In some embodiments the communication module 130, or one or more components of the communication module 130, may be configured to function as a network accelerator in that the communication module 130, or one or more components of the communication module 130, monitors incoming and/or outgoing data, removes duplicate data, compresses data before transmission, and/or caches frequently used data. In some embodiments, the communication module 130 may include any suitable combination of hardware and/or software to facilitate the described functionality. The communication module 130 in general may include any suitable number of wired and/or wireless transceivers, network interfaces, etc.

The memory module 140 is configured to store data corresponding to routing and determine a path for routing packets through a wireless network. The memory module 140 may include an incoming packet ID memory storage 141, a packet type detection program memory 142, a routing memory storage 144, an adjacent node memory storage 145, an adjacent node determination program memory 146, and a next node priority determining program memory 148. The incoming packet ID memory storage 141 is may contain data corresponding to the packet ID (contained in the header of the packet) of an incoming packet. The packet type detection program memory 142 may include program instructions that are executed to determine whether a packet received, via the transceiver 132, is a data packet or an update packet. In some embodiments, a data packet may correspond to a packet containing data that is being transmitted to a destination device. In some embodiments, an update packet may correspond to a packet containing updates for route characteristics within a communication network. The routing memory storage 144 may contain data corresponding to one or more destination addresses, next-node MAC addresses, adjacent node MAC addresses, priority numbers corresponding to the order in which a node is to receive a packet, and/or aggregate path characteristics. In some embodiments, the data contained in the routing memory storage 144 may be updated based on the performance of a packet that was transmitted from the device 1100. The adjacent node memory storage 145 may be configured to contain data, such as one or more link characteristics, corresponding to one or more nodes adjacent to the device 110. In some embodiments, the data contained in the adjacent node memory storage 145 may be updated after a message, acknowledging successful receipt of a transmitted packet from the device 110, is transmitted back to the device 110. The adjacent node determination program memory 146 may include program instructions that are executed to determine which nodes are adjacent to the device 110. The next node priority determining program memory 148 may include program instruction that are executed to determine the priority (e.g., first, second, third, etc.) of nodes, adjacent to the device 110. The device 110 may use the determined priorities when making routing decisions, as discussed in more detail below. In some embodiments, the program instructions stored in the next node priority determining program memory 148 may correspond to an algorithm that determines the priority number of each node within path based on previous data, past routing decisions, and/or link characteristics. In some embodiments, data corresponding to the identity of the one or more adjacent nodes and/or the priority of nodes in a network to receive a packet from the device 110 may be aggregated into the routing memory storage 144.

The phase synchronization module 150 is configured to store, synchronize, and prepare packets for transmission. The phase synchronization module 150 may include a phase determination program memory 152, an N-phase memory storage 154, an (N+1)-phase memory storage 155, an (N+2)-phase memory storage 156, and a network coding program memory 158. The phase determination program memory 152 may include program instructions that are executed to determine the phase-representation of the node (i.e., a first, second, third phase, etc.). In some embodiments, the program instructions stored in the phase determination program memory 152 correspond to calculating a phase representation metric based on a count of phases that is weighted by a received signal strength indicator (RSSI) of each respective phase. The N-phase memory storage 154 may contain data corresponding to a packet to be transmitted during the determined phase representation of the device 110. The (N+1)-phase memory storage 156 may contain a first packet, or data corresponding to a first packet, received by the device 110 during a first phase that is not the device's own phase representation. The (N+2)-phase memory storage 158 may contain a second packet, or data corresponding to a second packet, received by the device 110 during a second phase that is not the device/node's own phase-representation. It should be appreciated that the phase synchronization module 150 may include a dedicated memory storage unit for packets received during that phase (i.e., an N+3-phase memory storage to contain a fourth packet received during a fourth phase, etc.) The network coding program memory 158 may include program instructions that are executed to cause an XOR function to be applied to the first packet (or data corresponding to the first packet), stored in the (N+1)-phase memory storage 156, and the second packet (or data corresponding to the second packet), stored in (N+2)-phase memory storage 158. In some embodiments, the resulting packet of the XOR-function is stored in the N-phase memory storage 154. While primarily described in various embodiments herein as a three-phase system (and including dedicated components/hardware to accommodate a three-phase system), in general the device 110 may use the same/similar phase synchronization components and techniques for any number of phases (e.g., four phases, five phases, eight phases, nine phases, etc.). It should also be appreciated that additional hardware/components may be employed to accommodate a system integrating more phases.

Although the CPU 120, the communication module 130, the memory module 140, the phase synchronization module 150, and their respective components, are illustrated as separate modules/components, it should be appreciated that in some embodiments, some of these modules, components, and/or the data/instructions contained within these modules/components may be combined and/or combined with other modules not described or illustrated.

The protective housing 170 is configured to physically house the various components of the device 110. The protecting housing 170 may be generally configured to protect the components of the device 110 from the environment and from electrical hazards that might damage the components (e.g., electrical discharge), may provide an aesthetically pleasing package, may facilitate mounting of the device 110 to a support structure (e.g., a post, beam, tower, or other structure), and/or may facilitate coupling of the device 110 to various auxiliary devices. In some embodiments, the protective housing 170 may be sealed so that the components are impervious to precipitation (e.g., rain, snow, sleet, hail, etc.), excess heat/cold temperatures, wind, sunlight, lightning, insects, animals, and/or other environmental conditions. In some embodiments, a variety of openings or ports may be disposed in and/or on the protective housing 170. The protective housing 170 may include openings for coupling the device 110 to an auxiliary device, power source, or other component.

The device 110 may be coupled to, disposed within, or communicatively connected to buildings, transportation, or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other environmental infrastructure system components. Examples of other sources that may transmit or receive data to/from the device 110 include smart vehicles; original telematics devices; buildings; public transportation systems; smart street signs or traffic lights; smart infrastructure, roads, or highway systems (including smart intersections, exit ramps, and/or toll booths); smart trains, buses, or planes (including those equipped with Wi-Fi™ or hotspot functionality); smart train or bus stations; aerial, drone, or satellite devices; nodes, relays, and/or other devices capable of wireless communications; and/or other devices or systems that capture/store data and/or are configured for wired or wireless communication.

In some embodiments, the device 110 may include one or more antennas configured to form a phased array in the direction of equal phase offset between antennas. In the case of radios with multiple spatial streams, directed streams must be discernible through differences in polarization or physical distance. Each spatial stream forms an independent phased array. These directional arrays can form high-throughput peer-to-peer connections within the limited number of adjacent nodes forming a backhaul. Multiple-User Multiple-Input Multiple-Output (MU-MIMO) systems can be split up by the respective spatial streams into separate directional antennas oriented in the direction of adjacent nodes. Grouped by the channels associated with a single client, this allows each multi-stream phased array to operate with a smaller total number of distinct polarizations (and thus more easily differentiable streams in the far-field).

Figure 1C:
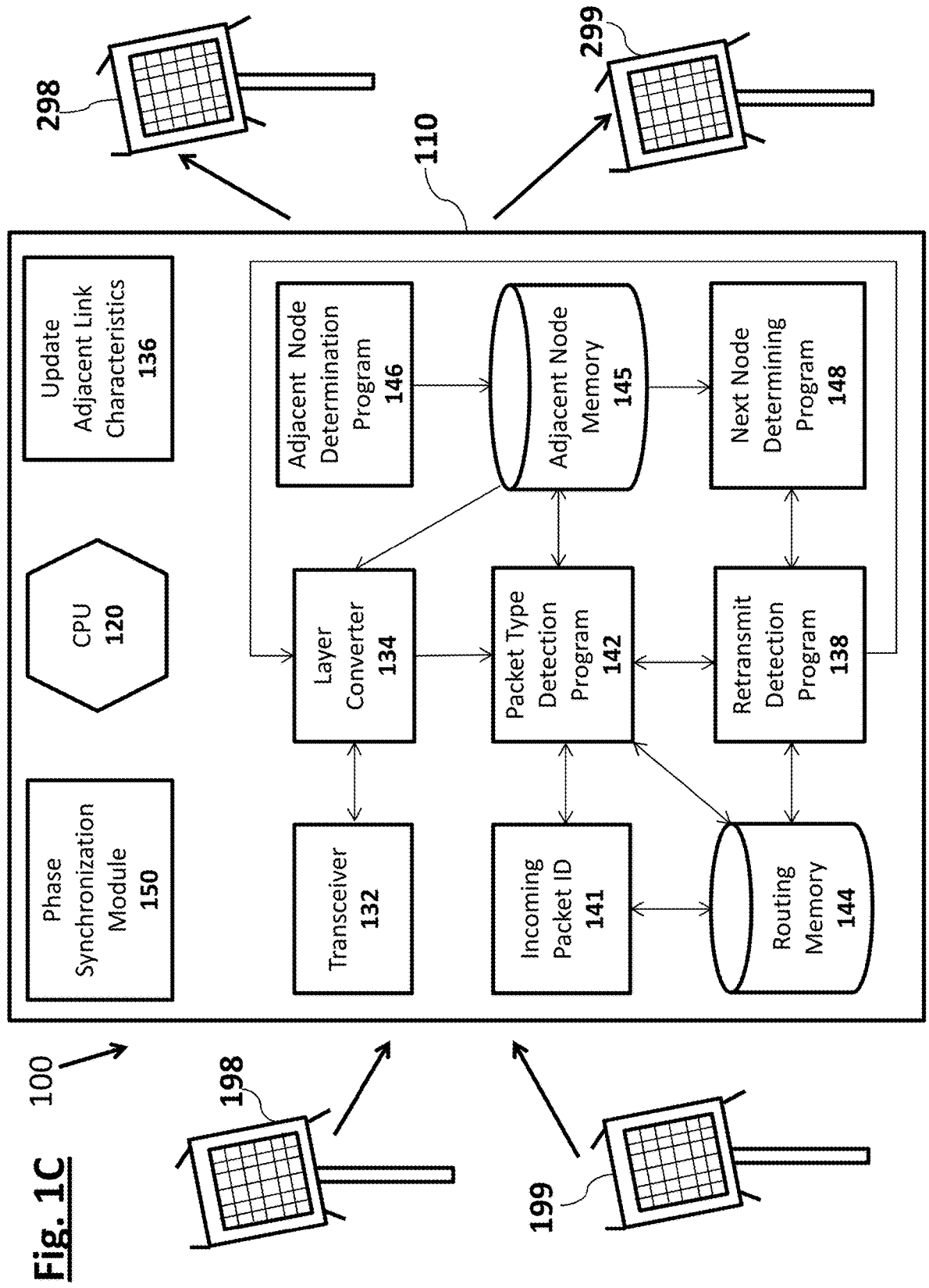
FIG. 1C illustrates an embodiment of a system for aggregating data within a communication network.

FIG. 1C illustrates an embodiment of a system for aggregating data within a communication network 100. The system comprising a communication network 100 (hereinafter "the communication network") may include device 110, device 198, device 199, device 298 and device 299. Each of devices 110, 198, 199, 298, and 299 may be the same, or operate in a similar manner using the same or similar components, as the device 110 described with respect FIGS. 1A, 1B, and 1D.

Figure 1D:
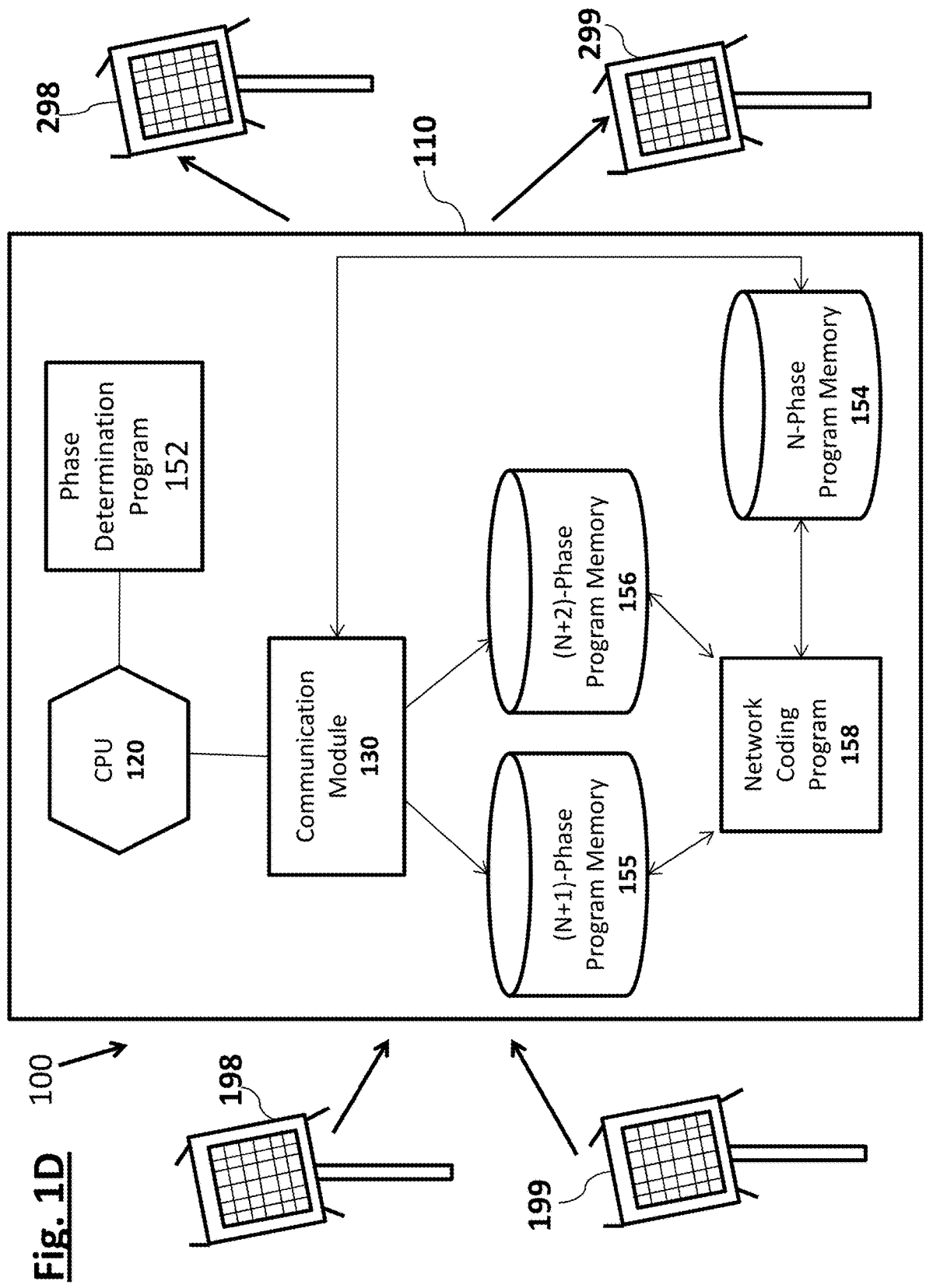
FIG. 1D illustrates an embodiment of a system for clustered phase synchronization within a communication network.

FIG. 1D illustrates an embodiment of a system for clustered phase synchronization within a communication network. The system comprising a communication network 100 (hereinafter "the communication network") may include device 110, device 198, device 199, device 298 and device 299. Each of devices 110, 198, 199, 298, and 299 may be the same, or operate in a similar manner using the same or similar components, as the device 110 described with respect FIGS. 1A, 1B, and 1C.

The communication network 100 of the present disclosure may be configured to facilitate data communications between a plurality of devices (e.g., the devices 110, 198, 199, 298, and 299) via any suitable number of wireless and/or wired connections. For example, the communication network 100 may include one or more telecommunication networks, nodes, access points, base stations, and/or links used to support data communications, and may facilitate a connection to the Internet for devices connected thereto. Accordingly, communication network 100 may include any suitable number and/or type of interconnected network components that form an aggregate network system such as, for example, dedicated access lines, plain ordinary telephone lines, satellite links, cellular base stations, public switched telephone networks (PSTN), a wireless telephony network (e.g., GSM, CDMA, LTE, etc.), a Wi-Fi™ network (e.g., via one or more IEEE 802.11 standards such as 802.11s), a WiMAX network, a proprietary network, a secure public internet, a mobile-based network, a virtual private network, etc., or any suitable combination thereof.

In some embodiments, the communication network 100 may be a private network and one or more security measures/protocols may be implemented to facilitate communications between device 110, device, 198, device 199, device 298, and/or device 299. In some embodiments, the communication network 100 may be a public network in which a user can facilitate communication with device 110, device 198, device 199, device 298, and/or device 299 without adhering to any extra or specific security measures/protocols.

In some embodiments, the communication network 100 can be expanded, thereby increasing the coverage area/size, speed, and/or functionality of the communication network 100, by adding additional nodes (e.g., the device 110) to the communication network 100. In some embodiments, the communication network 100 can be reduced, thereby decreasing the coverage area/size, speed, and/or functionality of the communication network 110, by removing nodes (e.g., the device 110) from the communication network 100.

In some embodiments, the communication network 100 may be a new wireless communication network that is created by the use of a plurality of devices, such as the device 110 described above. In some embodiments, the communication network 100 may be an existing wireless communication network that operates on existing devices. It should be appreciated that the device 110 may be incorporated into existing communication networks, thereby retrofitting an existing communication network, and may provide one or more of the benefits described herein. In some embodiments, the communication network 100 may be a subnet that exists as part of network on a different layer (e.g., link, network, protocol, and application layer). For example, an existing network may exist on layer 2, and the communication network 100 may be integrated into layer 2 on a subnet on layer 3.

In some embodiments, the communication network 100 may be used to operate a block chain, crypto currency, and/or other related technology. In such embodiments, data corresponding to block chain transactions may be received, processed, analyzed, validated, stored, and or transmitted using the device 110, or a plurality of devices within the communication network 100.

In some embodiments or scenarios, the communication network 100 supports Transmission Control Protocol (TCP). In some embodiments, the communication network 100 supports User Datagram Protocol (UDP). For example, the communication network can send packets of a certain type (e.g., data packets) using TCP, and packets of another type (link characteristics updates) using UDP.

Data Aggregation for Distributed Routing Decisions

Referring back to FIG. 1C, the communication network 100 can operate as an ad-hoc mesh network. Routing decisions in the communication network 100 can be distributed among the nodes such as the device 110. As discussed below, a node can aggregate data that indicates how efficiently packets are delivered to devices along particular routing paths, as well as data that indicates how well links between the node and the neighbor perform. When new information becomes available, e.g., when a new packet which the node forwarded to an adjacent node reaches the corresponding target device, the node updates the data to improve the quality of subsequent routing decisions. To this end, the node receives an update packet, or simply update, indicative of performance of the recently transmitted packet.

These routing techniques are discussed below primarily with reference to the device 110, which operates as a node of the wireless communication network 100. For clarity, routing devices are referred to herein as "nodes" and user devices or other devices that originate and/or consume data are referred to as "devices." However, in some embodiments, data originators and consumers also can operate as nodes of the wireless mesh network. For example, a user can configure her smartphone so as to allow routing of data to and from other devices, provided that doing so complies with privacy policies and preferences. Thus, both dedicated routers and devices with other primary functions, including smartphones, laptops, and other user devices, can implement distributed routing decisions of this disclosure.

In an embodiment, individual nodes in the communication network 100 are not aware of complete routing paths between sources and destinations. Routing decisions thus are distributed among the multiple nodes of the communication network 100. For example, if a packet traverses sequentially nodes A, B, C, and D on its way to the destination, node A may be provisioned only to know that the packet is to be forwarded to node B to eventually reach the destination, node B in turn may be provisioned only to know that the packet is to be forwarded to node C, etc. A node can maintain a routing table in the routing memory storage 144, as discussed above, with an example entry corresponding to a certain routing path and specifying a destination address and an address of an adjacent node (e.g., a MAC address). Further, because a packet in some cases can reach the same destination via more than a single path, the routing table can include multiple entries for the same destination, and the entries further can store indications of priority of routing paths. For example, the routing table at a certain node can indicate that a packet can reach device D via adjacent node A or adjacent node B, but the routing path via node A has higher priority than the path via node B. Still further, the node can dynamically update the priorities of routing paths in view of how efficiently a packet was recently delivered, and to this end the node can store aggregate characteristics for various routing paths. Thus, an entry in the routing table, corresponding to a routing path, can specify the destination, the next node, the current priority value, and the aggregate characteristics for the routing path, or "aggregate path characteristics." It is noted again that the entry corresponding to a routing path need not store a description of the entire routing path, such as a listing of every intermediate node and/or every communication link between the node and the destination.

In addition to maintain a routing table, a node in some embodiments can maintain a link characteristics table to store aggregate characteristics of links ("aggregate link characteristics") via which the node can directly access its neighbor nodes. Unlike aggregate path characteristics that indicate how efficiently and accurately packets have been delivered to the destination along a certain routing path, aggregate link characteristics indicate how well a particular link between a pair of nodes has been performing. For example, at a certain point in time, node A can determine that nodes B, C, and D are the immediate neighbors of node A, and thus the link characteristic table at node A can store aggregate link characteristics for each wireless communication link coupling node A to nodes B, C, and D, respectively. Nodes can use aggregate link characteristics to generate aggregate path characteristics, in some embodiments. For example, node A can adjust the signal-to-noise (SNR) metric for the link between nodes A and B, and accordingly adjust the aggregate path characteristics for a routing path that traverses nodes A and B.

Although the examples above refer to tables, in general characteristics of routing paths and links can be stored using any suitable data structures such as linked lists, n-trees, etc.

As mentioned above, examples of link and/or path characteristics which a node can store and aggregate in its one or more tables include the number of jumps or hops on the way to a destination, which can be stored as a positive integer; the propagation delay, which can be measured in milliseconds or microseconds, for example; the packet loss, which can be expressed as a percentage value; a packet window, which can be expressed in milliseconds or microseconds and indicate a time period during which a packet must be delivered to satisfy the corresponding quality of service requirement; the throughput between a pair of nodes (or between the node and the destination, depending on the embodiment), which nodes can estimate based on PHY characteristics, interference levels, etc.; and the encoding supported by the adjacent node and/or other nodes disposed along the path to the destination. More generally, each node can store any number of metrics that can serve as predictors of how reliably and efficiently a packet will be delivered to the destination.

Several examples of characteristics of links and/or routing path are listed below:

$$H_i = H_{i-1} + 1 \quad \text{(equation 1)}$$

where H is the number of hops. Thus, according to equation 1, hop count simply increases as a data packet traverses another node on its way to the destination. Packet loss L can be measured in a similar manner:

$$N_i = N_{i-1} + 1 \quad \text{(equation 2)}$$

Delay D can be measured by adding up the delays of a data packet along the entire routing path:

$$D_i = D_{i-1} + D_{i,adj} \quad \text{(equation 3)}$$

Further, mean packet window $W_{(a)}$ can be expressed as:

$$W_{(a)i} = \frac{H_{i-1} W_{(a)i-1} + W_{(a)i,adj}}{H_i} \quad \text{(equation 4)}$$

and minimum packet window $W_{(m)}$ can be expressed as:

$$W_{(m)i} = \min(W_{(m)i-1}, W_{(m)i,adj}) \quad \text{(equation 5)}$$

Mean throughput $T_{(a)}$ can be expressed as:

$$T_{(a)i} = \frac{H_{i-1} T_{(a)i-1} + T_{(a)i,adj}}{T_i} \quad \text{(equation 6)}$$

and minimum throughput $T_{(m)}$ can be expressed as:

$$T_{(m)i} = \min(T_{(m)i-1}, T_{(m)i,adj}) \quad \text{(equation 7)}$$

Median encoding $E_{(a)}$ can be expressed as:

$$E_i = E_{i-1} + E_{i,adj} \quad \text{(equation 8)}$$

And Minimum Encoding $E_{(m)}$ can be expressed as:

$$E_{(m)i} = \min(E_{(m)i-1}, E_{(m)i,adj})  \quad \text{(equation 9)}$$

A node can assign priority values to different entries in the routing table in view of the aggregate routing path characteristics. Although a node can be configured to apply a certain predefined algorithm to assign priorities (e.g., "route based on the minimum number of hops to the destination," or "route based on the minimum propagation delay), none of the fixed algorithms may be optimal in complex mesh networks, particularly when environmental conditions as well as conditions at the individual nodes (e.g., the noise level, the power level, the current workload) tend to change frequently and unpredictably. Accordingly, in some embodiments, a node can use machine learning (ML) techniques to assign priority to the routing paths represented by different entries in the routing table. Generally speaking, an ML model first can be trained using various aggregate path characteristics as inputs. The output of the ML model can include individual priority values for various routing paths. Each priority value may be an integer, for example, or one of several enumerated values (e.g., "low," "medium," "high").

In other embodiments, a node can assign priorities to links rather than routing paths, and use the priorities of the individual links in routing. In other words, a node can forward a packet via a link with the highest priority (rather than along a path with the highest priority), provided the destination device is reachable via the link. When at most one link connects a node to another node, assigning a priority to a link is equivalent to assigning this priority to the node at the other end of the link.

During operation of the communication network 100, the node can continue to supply feedback to the ML model using updates and/or other feedback data. As discussed in more detail below, a node can receive and transmit updates related to routing paths and/or links, and can continuously aggregate the latest indications of performance into the link characteristics and routing path characteristics. In contrast to predefined algorithms for routing packets, ML techniques allow a node to discover which of the multiple characteristics of a certain routing path, or what combination of these characteristics, is a better predictor of successful and timely delivery of a packet. Further, ML techniques allow the node to automatically adjust the relative weights of the routing path characteristics in response to changes in the environment (e.g., increases in radio interference) or packet delivery requirements (e.g., transmission of critical data with low delay tolerance).

These distributed techniques allow routing information to be propagated more efficiently through the communication network 100. As one alternative to these distributed routing techniques, nodes can report various metrics to a dedicated routing server (or otherwise to a centralized system), and the server can generate all routing paths in the communication network and then distribute the relevant routing data to the individual nodes. The routing server in these embodiments must have complete knowledge of the network, which requires that nodes at least report the status of communication links interconnecting pairs of nodes to the routing server. Further, if the routing server also implements ML techniques and adjusts routing in view of multiple link and routing path characteristics, the nodes of the communication network must frequently even more data to the routing server. This centralized approach to routing thus requires significant overhead.

In an example scenario, the device 110 receives a packet, via the transceiver 132, from the node 199. In some embodiments, the device 110 processes a packet at the PHY layer, extracts the link layer data, and makes the routing decision in view of the information transmitted at the link layer. In some embodiments or scenarios, however, the device 110 can determine what action should be applied to the packet based only on the data at the PHY layer, so that the communication effectively is limited to the PHY layer. Similarly, the device 110 in some cases need not translate data between the link layer and the network layer in order to route a packet, and thereby advantageously reduce the number of operations necessary to determine where the packet should be transmitted In some embodiments or scenarios, upon receiving a packet or prior to transmitting a packet (or another data unit) from the device 110 to another node or end device, the CPU 120 may execute program instructions stored in the data layer converter 134 to convert/translate the packet/signal/data intended for transmission, or data contained within the packet intended for transmission, between two or more layers, e.g., from the network layer to the link layer, and/or from the link layer to the physical layer. Preventing excess packet conversions by operating the device 110 primarily on the link layer, for example, improves/increases network efficiency, reduces the amount of processing needed to analyze/process/transmit/receive packets, and thus reduces/decreases the amount of power (both locally at the power module 112 and at transmitting/recipient devices).

After the packet is received by the device 110 from the node 199, the CPU 120 may execute program instructions stored in the update adjacent link characteristics program memory storage 136 in order to update the link characteristics of one or more adjacent nodes, and the CPU 120 may store the updated adjacent link characteristics in the adjacent node memory storage 145.

Next, the CPU 120 executes program instructions stored in the packet type detection program memory storage 142 in order to determine whether the received packet is a data packet, an update packet, or another type of packet. In some embodiments, the CPU 120 may determine whether the received packet is a data packet or an update packet based on data, such as a type identifier, a flag, a signature, etc. contained in the header of the received packet. In some embodiments, The CPU 120 may store the identifier of the received packet ("packet ID"), which may be contained in the header of the packet, in the packet ID memory storage 141. The device 110 also may store an indication of when the packet was received, so that the device 110 subsequently can determine whether the packet has traveled through this node recently, according to one embodiment.

When the CPU 120 determines that the received packet is a data packet, the CPU 120 may then analyze the received packet to determine the destination address of the packet, i.e., to which the destination device the packet is to be forwarded. Depending on the implementation, the destination address may be represented in the form of an IP address, a MAC address, or another suitable identifier of a device or network node. The CPU 120 may execute program instructions stored in the retransmit detection program memory storage 138 to compare the destination address specified by the packet to the information in the routing table. After determining that the routing memory storage 144 includes an entry for the destination address of the received packet, the CPU 120 will execute program instructions (stored in the next node priority determining program memory 148, for example) to determine a node to which the device 110 should send the packet next. In some cases, multiple options are available, and the device 110 selects the node to which the packet is to be sent in view of the priorities assigned to the relevant routing paths.

It should be appreciated that in some cases, the next node to receive the packet may be determined prior to the device 110 receiving the packet. When the CPU 120 determines that node 199 is the node with the highest priority, i.e., the node determined to be the next node to receive the packet from the device 110, is the same node as the node from which the device 110 received the packet (i.e. node 199), the CPU 120 will transmit the packet to the node determined to have the next highest priority (e.g., node 299), i.e. the node determined to have the second highest priority. In those situations where the CPU 120 determines node 199 is the node with the highest priority, the CPU 120 will cause the transceiver 132 to transmit the packet to node 299 (i.e., the node with the second highest priority). When the CPU 120 determines that node 299 is the node with the highest priority, i.e. the node determined to be the next node to receive the packet from the device 110 (but not node 199 from which the device 110 received the packet), the CPU 120 will cause the transceiver 132 to transmit the packet to node 299. In some embodiments next node routing may be determined based on a central routing data stored in the routing memory storage 144.

In another embodiment of the communication network 100, when the CPU 120 determines that the destination address of the received packet, or data corresponding to the destination of the received packet, is not contained in the routing memory storage 144, the CPU 120 will cause the transceiver 132 to transmit a negative acknowledgment (NACK), to indicate that there was an error in the device 110 receiving/processing the received packet, to the node 199. For example, in one embodiment, the device 110 may transmit a NACK to the node 199 as a result of the device 100 receiving the packet in error, or the device 100 being unable to forward the packet. After the node 199 receives the NACK, node 199 will transmit the packet to the node with the next highest priority to receive a packet (determined by analyzing a routing memory storage of the node 199). For example, in an embodiment in which data stored in a routing memory storage of the node 199 corresponds to node 299 having the next highest priority after device 110, node 199 will transmit the packet (previously transmitted to device 110) to node 299 because node 299 has the next highest priority. In some embodiments, the NACK may be handled on a layer higher than the link layer.

In another embodiment of the communication network 100, when the CPU 120 determines that the received packet is an update packet, the CPU 120 may then analyze the received packet to determine whether the received packet has recently traveled through the device 110 so that data, corresponding to the route of the received packet, can be aggregated into the routing memory storage 144. In one embodiment, the CPU 120 may determine whether the received packet has recently traveled through the device 110 by comparing the packet ID of the received packet, stored in the packet ID memory storage 141, with data, corresponding to the packet ID of one or more packets that have recently traveled through the device, stored in the routing memory storage 144. When the CPU 120 determines that the received packet has not recently traveled through the device 110, i.e. the routing memory storage 144 does not contain any data corresponding to the packet ID of the received packet, the CPU 120 will add data corresponding to the received packet to the routing memory storage 144. However, in such embodiments, the CPU 120 will not retransmit the received packet, thereby not continuing to spread the update packet received from node 199.

In another embodiment of the communication network 100, when the CPU 120 determines that the received packet has recently traveled through the device 110, i.e. the routing memory storage 144 contains data corresponding to the packet ID of the received packet, the CPU 120 may update the data stored in the routing memory storage 144 to include the data, contained within the received packet, corresponding to updated information/data. The CPU 120 may execute program instructions stored in the adjacent node determination program memory 146 in order to determine the identity of all nodes adjacent to the device 110. The CPU 120 may cause the transceiver 132 to transmit the received packet, now determined to be an update packet, to one or more nodes adjacent to the device 110. For example, in an embodiment in which node 198, node 298, and node 299 are adjacent nodes to the device 110, the CPU 120 will transmit the received packet to node 198, node 298, and node 299 after the CPU 120 determines that the recently packet had recently traveled through the device 110.

When a new node is added to the communication network, the new node can flood the communication network with packets to determine routing paths to various destinations. These packets also can be used to update link characteristics applicable to the already-existing routing paths. As a result of the new routing paths appearing in the communication network, the priorities of some of these existing routing paths may change. In one embodiment, a routing path will shift to new nodes if the characteristics of the links in the routing define a better overall path, in terms of the overall speed of the communication network, the quality of service of the routing paths, etc.

Clustered Synchronization

FIG. 1D illustrates an embodiment of a system for clustered phase synchronization within a communication network. The following disclosure will explain in greater detail how the device 110 utilizes synchronizing techniques to efficiently route a packet through a communication network 100. Generally speaking, the device 110 uses network coding to maximize and regulate the flow of packets within the communication network 100 by transmitting and receiving packets based on predetermined phase iterations. The use of synchronized phasing technique prevents superfluous transmission of feeler packets.

In an embodiment of the communication network 100, at start-up, the CPU 120 may execute program instructions stored in the phase determination program memory 152. In some embodiments, executing the program instructions stored in the phase determination program memory 152 calculates a phase representation metric based on polling one or more nodes adjacent to the device 110, and selecting the most underrepresented phase (of the three phases), among the polled one or more adjacent nodes, to be phase of the device 110. In some embodiments, the phase representation metric is calculated as a count weighted by received signal strength indicator (RSSI) of the nodes adjacent to the device 110. In some embodiments, the phase representation of the device 110 is selected to be the most underrepresented phase in order to create relatively even distribution among phases throughout the communication network 100 in an effort to increase network coverage/size. In some embodiments, machine learning algorithms and/or techniques may be utilized to determine the phase representation of the device 110. In one scenario, the device 110 may have a phase representation corresponding to a first phase. In another scenario, the device 110 may have a phase representation corresponding a second phase. In another scenario, the device 110 may have a phase representation corresponding to a third phase. It should be appreciated that the phase representation of the device 110 may change for each packet transmitted through the communication network 100. While the device 110 may be configured to receive packets during all phases, the device 110 may only transmit a packet during its own phase representation. For example, if the device 110 is determined to have a phase representation of the first phase, the device 110 may receive packets during the first, second, or third phase. However, the device 110 may only transmit packets during its own phase representation, the first phase.

A benefit of the device 110 implementing this type of phase synchronization is that it reduces the amount of overhead by eliminating the need for the device 110 to constantly transmit feeler packets, as well as other devices (e.g., the nodes 198, 199, 298, and 299 of FIG. 1B) to receive and react to these feeler packets. For example, the device 110 may also transmit a Request to Send (RTS) signal during its determined phase, thereby moderating the number of Clear to Send (CTS) flow control signals a recipient node (e.g., one or more of the nodes 198, 199, 298, and 299) must transmit back to the device 110. In turn, reduced device/network overhead also reduces the amount of processing at each device, which then reduces the amount of power needed to run the device 110. In some embodiments, this technique may reduce power consumption by reducing the amount of time the transceiver(s) need to be active. In some embodiments, this phasing technique may create alternating overlapping areas of network coverage (as depicted in and described with respect to FIGS. 3A.1, 3A.2, 3A.3, 3B, 3C.1, 3C.2, and 3C.3). Consequently, this approach may make the most efficient use of bidirectional bandwidth over a large physical area, thereby enabling full coverage of a geographic physical space and/or fully utilizing bandwidth of the communication network 100.

The device 110 may store received packets that are to be retransmitted to other nodes, in the N-phase memory storage 154. However, in some embodiments, the device may store packets it receives during its own phase in the N-phase memory storage 154. In some embodiments, a packet window predefines the size of each transmission and is then kept constant throughout the communication network 100. The device 110 may store packets received during the phase immediately preceding its own phase in the (N+2)-phase memory storage 156. The device 110 may store packets received during the phase succeeding its own phase in the (N+1)-phase memory storage 155. For example, in an embodiment in which the device 110 is assigned a phase representation corresponding to the third phase, the node 198 is assigned a phase representation corresponding to the first phase, and the node 199 is assigned a phase representation corresponding to the third phase, the device 110 may receive a packet from the device 198 during the first phase and receive a packet from the device 199 during the second phase. The CPU 120 may then store the packet received from the device 198 in the (N+1) phase memory storage 155 and store the packet received from the device 199 in the (N+2)-phase memory storage 156. Further, the CPU 120 would then transmit a packet from the device 110 during the third phase.

After receiving a first packet during the (N+1)-phase and a second packet during the (N+2) phase, the CPU 120 may execute program instructions stored in the network coding program memory 158. In some embodiments, the program instructions stored in the network coding program memory 158 may correspond to performing network coding on one or more packets received by the device 110. In some embodiments, network coding allows for multiple packets received by the device 110 to be simultaneously transmitted to a plurality of nodes. In such embodiments, the device 110 may act as a center node of a geometric tessellation in which packets from one end of the tessellation are efficiently transmitted to one or more nodes at the other end of the tessellation by use of the device 110 serving as a center node. In some embodiments, the program instructions stored in the network coding program memory 158 correspond to the CPU 120 performing an exclusive-or (XOR) operation using the first packet stored in the (N+1)-phase memory storage 155 and the second packet stored in the (N+2)-phase memory storage 156. In some embodiments, the CPU 120 may store the resulting packet of the network coding XOR-operation in the N-phase memory storage 154. During the phase assigned to the device 110, the CPU 120 may cause the transceiver 132 to transmit the packet stored in the N-phase memory storage 154 to one or more recipient nodes (e.g., node 298 and node 299 of FIG. 1B). In the event a packet is transmitted to an unintended recipient node, a packet received during a successive phase can be XORed with that packet to recover the intended message. In some embodiments, the device 110, the device 198, the device 199, the device 298, and the device 299, for example, may operate in promiscuous mode in order to transmit and receive packets using the network coding techniques discussed above. In some embodiments, phase synchronization is implemented through time-stamped packets and buffering at the device 110. In some embodiments, the buffering delays caused by the device 110 preserve packet spacing and prevent collisions of packets at other points in the communication network 100.

In an example scenario where the device has been assigned the third phase representation, the CPU 120 may perform an XOR operation with the packet received during the first phase from packet 198 and a packet received during the second phase from packet 199. The CPU 120 may then cause the transceiver 132 to transmit the resulting packet, during the third phase, to packet 298 and packet 299.

In some embodiments, phasing synchronization may be carried out in time domain. Phase timing, or the trigger for transmitting one or more packets during the appropriate phase, may be calculated based on a periodic counter operating as a timer (e.g., a down counter or an up counter that counts a phase length of 10 seconds). In some embodiments, the phase synchronization timing may be a predefined window/range of time that is calculated based on a clock (e.g., the first phase takes place from 12:00:00 AM until 12:00:19 AM, the second phase takes place from 12:00:20 AM until 12:00:39 AM, etc.). In some embodiments, the length of a phase may account for the time to transmit and/or receipt a packet. In some embodiments, the length of a phase may incorporate/compensate for delays in transmission/receipt of packets between nodes. For example, in an embodiment in which the length of a full phase iteration is x seconds, if a 5-second delay occurs during the first phase (in which $t=x/3$), then second phase will occur at $t=(2x/3)+5$. In some embodiments, each phase may be calculated/based on a frequency domain. In embodiments in which the frequency domain determines the phasing synchronization, each phase may correspond to a different channel within the same communication band. Using frequency domain based phase synchronization may allow for frequency-division duplex communication within each of the cells.

In some embodiments, the device 110 may incorporate the data aggregation techniques described in FIG. 1C and the phase synchronization techniques described in FIG. 1D, separately or in conjunction.

Figure 2:
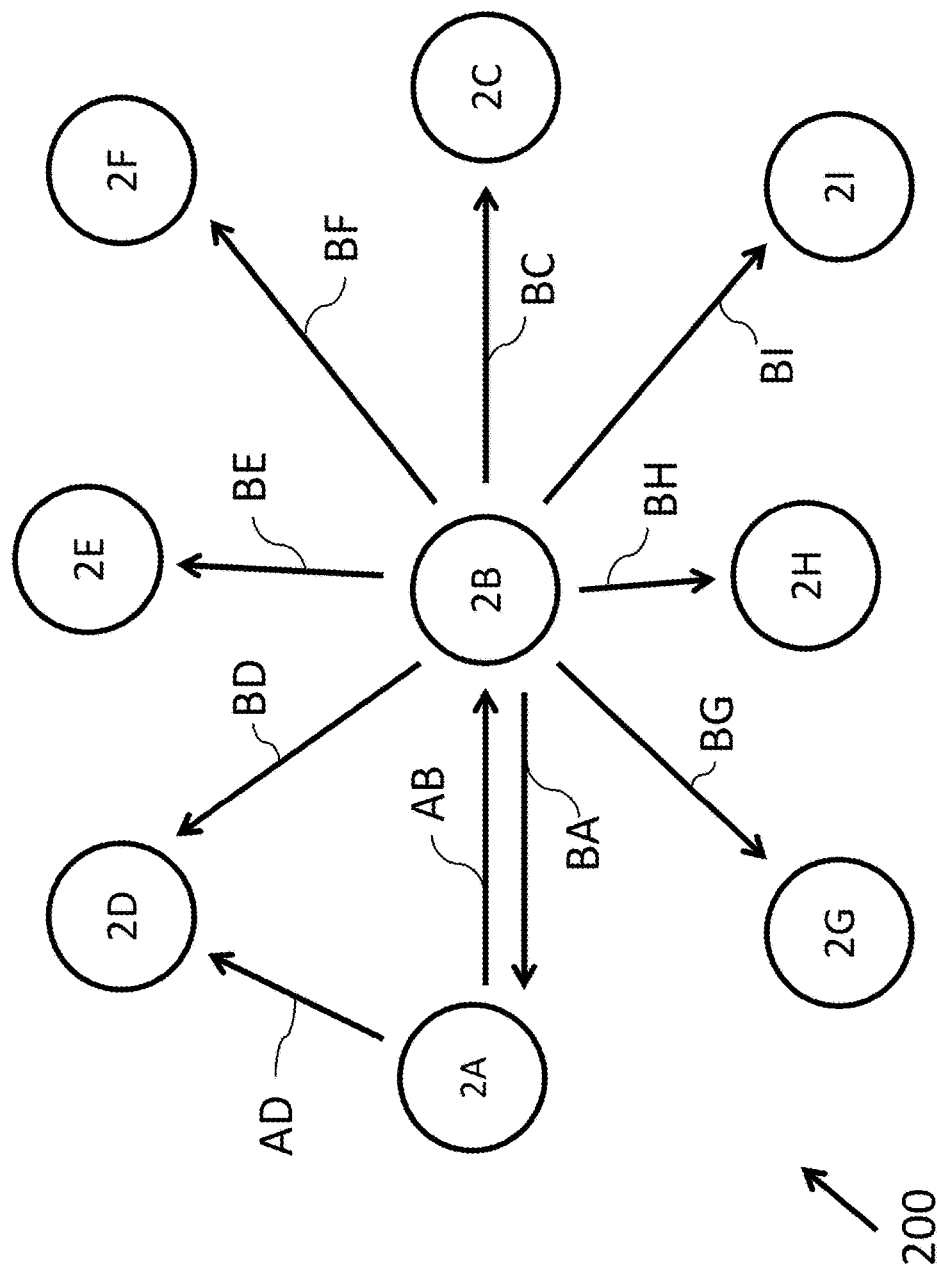
FIG. 2 illustrates an embodiment in which a packet is transmitted through a communication network.

FIG. 2 illustrates an example scenario in which a packet is transmitted through a communication network. The following disclosure will explain in great detail how the device 110 handles a received packet based on whether the packet is a data packet or an update packet.

As FIG. 2 illustrates, a communication network 200 may include a plurality of device/nodes 2A, 2B, 2C, 2D, 2E, 2F, 2G, 2H, and 2I. It should be appreciated that the some embodiments of the communication network 200 may include just some of the nodes 2A, 2B, 2C, 2D, 2E, 2F, 2G, 2H, and 2I, or may include additional nodes. In some embodiments, nodes 2A, 2B, 2C, 2D, 2E, 2F, 2G, 2H, and/or 2I may be implemented as the device 110 described above in connection with FIGS. 1A and 1B. Each of packets AB, AD, BA, BC, BD, BE, BF, BG, BH, and BI may be a data packet, update packet, or NACK depending on the embodiment of the communication network 200 and/or the particular operational state of the communication network 200. It should be appreciated that packets AB, AD, BA, BC, BD, BE, BF, BG, BH, and/or BI may be the same packet or contain the same (or some of the same) data, and the varying letter designations (e.g., "AB") are used merely for clarity and illustrative purposes. In this embodiment, node 2A transmits a packet AB to the node with the highest priority in a routing memory storage (e.g., the routing memory storage 144 of FIG. 1A). In this embodiment, node 2B is the node with the highest priority in the routing memory storage of node 2A, and thus node 2A will transmit packet AB to node 2B. Packet AB may be a data packet or an update packet. When node 2B receives packet AB, node 2B may update the adjacent link characteristics. After node 2B updates the adjacent link characteristics, node 2B may determine whether the packet AB received from node 2A is a data packet or an update packet.

When the packet AB is a data packet, node 2B may then determine whether the destination address of packet AB is contained in the routing memory storage of node 2B. When the destination address of packet AB is not contained in the routing memory storage of node 2B, then node 2B may transmit NACK BA to node 2A to indicate a negative acknowledgment. After node 2A receives NACK BA, node 2A may then determine the next highest priority node in the routing memory storage of node 2A and then resend packet AB to that node. In this embodiment, node 2D is the node with the next highest priority in the routing memory storage of node 2A, and thus node 2A sends packet AD (equivalent to/containing the same data as packet AB) to node 2D in response to node 2B sending NACK BA to node 2A, thereby effectually resending packet AB to the next highest priority node.

When the destination address of packet AB is contained in the routing memory storage of node 2B, node 2B then determines whether the node with highest priority for a specific path/destination, stored in the routing memory storage of node 2B is the same node as the original source node of the packet AB. Thus, in this embodiment when node 2C, for example, is the node with the highest priority node, the node 2B will transmit the packet AB to node 2C. However, in this embodiment, if node 2A is the node with the highest priority, then node 2B will not transmit packet AB to node 2A because node 2A is the original source node of the packet AB. Accordingly, the node 2B may transmit packet AB to the node with the next highest priority (i.e., one of nodes 2C, 2D, 2E, 2F, 2G, 2H, or 2I, for example). Thus, in an embodiment in which node 2H is the node with the next highest priority for a specific path/destination behind node 2A, node 2B will transmit packet BH (equivalent to/containing the same data as packet AB) to node 2H.

When the packet AB is an update packet, node 2B may determine whether the packet AB has recently traveled through node 2B. When node 2B determines that packet AB has not recently traveled through node 2B, then node 2B may add a new line to the routing memory storage of node 2B corresponding to the routing update data contained in packet AB. When the node 2B determines that the packet AB has recently traveled through node 2B, then node 2B may update existing data stored in the routing memory storage and then transmit packet AB to the one or more nodes adjacent to node 2B. For example, in an embodiment in which nodes 2C, 2D, 2E, 2F, 2G, 2H, and 2I are adjacent nodes to node 2B, node 2B may transmit packet BC (equivalent to/containing the same data as packet AB) to node 2C, packet BD (equivalent to/containing the same data as packet AB) to node 2D, packet BE (equivalent to/containing the same data as packet AB) to node 2E, packet BF (equivalent to/containing the same data as packet AB) to node 2F, packet BG (equivalent to/containing the same data as packet AB) to node 2G, packet BH (equivalent to/containing the same data as packet AB) to node 2H, and/or packet BI (equivalent to/containing the same data as packet AB) to node 2I.

The following disclosure, corresponding to FIGS. 3A.1, 3A.2, 3A.3, 3B, 3C.1, 3C.2, and 3C.3, will explain in great detail how phased synchronization and network coding is used to efficiently transmit packets through a communication network.

FIG. 3A.1 illustrates an embodiment of a first cluster of a communication network. As FIG. 3A.1 illustrates the communication network 300, and may operate in a manner as described above with respect to phase synchronization. The communication network 300 may include a plurality of nodes $A_{N1}$, $A_{N2}$, $A_{N3}$, $A_{N4}$, $B_{N1}$, $B_{N2}$, $B_{N3}$, $B_{N4}$, $C_{N1}$, $C_{N2}$, $C_{N3}$, and $C_{N4}$. It should be appreciated that the communication network 300 may include just some of the nodes $A_{N1}$, $A_{N2}$, $A_{N3}$, $A_{N4}$, $B_{N1}$, $B_{N2}$, $B_{N3}$, $B_{N4}$, $C_{N1}$, $C_{N2}$, $C_{N3}$, and $C_{N4}$, or may include additional nodes. In some embodiments, each of nodes $A_{N1}$, $A_{N2}$, $A_{N3}$, $A_{N4}$, $B_{N1}$, $B_{N2}$, $B_{N3}$, $B_{N4}$, $C_{N1}$, $C_{N2}$, $C_{N3}$, and $C_{N4}$ may be the device 110 as described above in connection with FIGS. 1A and 1B. The communication network 300 may also include packets $A_{P1}$, $A_{P2}$, $A_{P3}$, $A_{P4}$, $B_{P1}$, $B_{P2}$, $B_{P3}$, $B_{P4}$, $C_{P1}$, $C_{P2}$, $C_{P3}$, and $C_{P4}$. In some embodiments, the nodes may transmit packets as described above in connection with FIG. 2. In some embodiments, a plurality of nodes may comprise a cluster. For example, in this embodiment, nodes $A_{N1}$, $A_{N2}$, $A_{N3}$, $B_{N1}$, $B_{N2}$, $B_{N3}$, and, $C_{N1}$ comprise cluster $L_1$, with node $C_{N1}$ serving as the center node of the cluster $L_1$. The center node of the cluster may be configured to buffer packets so as to route non-overlapping adjacent clusters synchronously. In some embodiments, network coding enables a center node to simultaneously transmit multiple packets within a cluster.

FIG. 3A.2 illustrates an embodiment of a second cluster of a communication network. FIG. 3A.2 illustrates the communication network 300, and may operate in a manner as described above with respect to phase synchronization. The components illustrated in FIG. 3A.2 correspond to and operate in the same manner as the like-numbered components shown in FIG. 3A.1. In some embodiments, a plurality of nodes may comprise a cluster. For example, in this embodiment, nodes $A_{N2}$, $A_{N3}$, $A_{N3}$, $C_{N1}$, $C_{N2}$, $C_{N3}$, and, $B_{N3}$ comprise cluster $L_2$, with node $B_{N2}$ serving as the center node of the cluster $L_2$.

FIG. 3A.3 illustrates an embodiment of a third cluster of a communication network. FIG. 3A.3 illustrates the communication network 300, and may operate in a manner as described above with respect to phase synchronization. The components illustrated in FIG. 3A.3 correspond to and operate in the same manner as the like-numbered components shown in FIGS. 3A.1 and 3A.2. In some embodiments, a plurality of nodes may comprise a cluster. For example, in this embodiment, nodes $B_{N2}$, $B_{N3}$, $B_{N3}$, $C_{N1}$, $C_{N2}$, $C_{N4}$, and, $A_{N3}$ comprise cluster $L_3$, with node $A_{N3}$ serving as the center node of the cluster $L_3$.

Figure 3B:
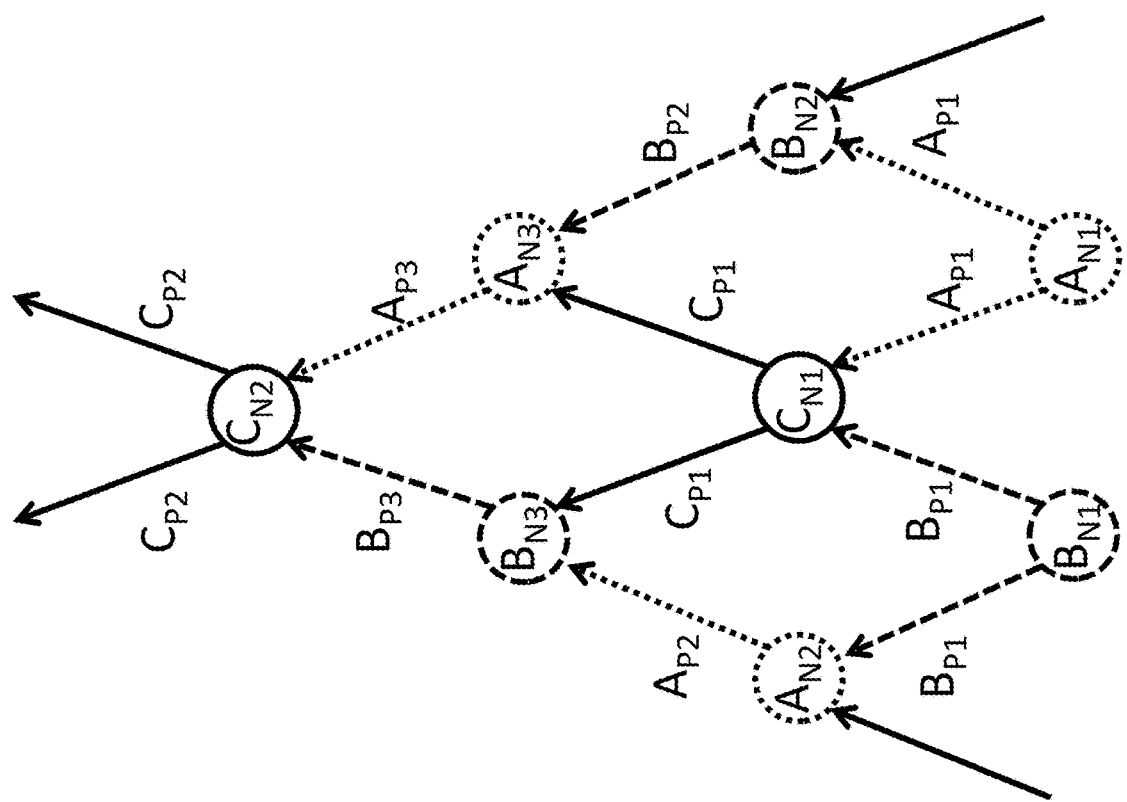
FIG. 3B illustrates an embodiment of a phased synchronization communication network.

FIG. 3B illustrates an embodiment of a phased synchronization communication network. As FIG. 3B illustrates, the communication network 300 may include nodes $A_{N1}$, $A_{N2}$, $A_{N3}$, $B_{N1}$, $B_{N2}$, $B_{N3}$, $C_{N1}$, and $C_{N2}$. It should be appreciated that the communication network 300 may include just some of the nodes $A_{N1}$, $A_{N2}$, $A_{N3}$, $B_{N1}$, $B_{N2}$, $B_{N3}$, $C_{N1}$, $C_{N2}$, and $C_{N3}$, or may include more nodes (e.g., $A_{N4}$, $B_{N4}$, $C_{N3}$, $C_{N4}$, etc.). The communication network 300 may also include packets $A_{P1}$, $A_{P2}$, $A_{P3}$, $B_{P1}$, $B_{P2}$, $B_{P3}$, $C_{P1}$, and $C_{P2}$. In this embodiment, node $C_{N1}$ operates as the center node of a first phase cluster (e.g., cluster $L_1$ of FIG. 3A.1) created by nodes $A_{N1}$, $A_{N2}$, $A_{N3}$, $B_{N1}$, $B_{N2}$, and $B_{N3}$. Packet $A_{P1}$ is transmitted from node $A_{N1}$ to nodes $B_{N1}$ and $C_{N1}$, packet $A_{P2}$ is transmitted from node $A_{N2}$ to nodes $B_{N3}$, and packet $A_{P3}$ is transmitted from node $A_{N3}$ to node $C_{N3}$. Packets $A_{P1}$, $A_{P2}$, $A_{P3}$ are all transmitted during the same phase. Packet $B_{P1}$ is transmitted from node $B_{N1}$ to nodes $A_{N2}$ and $C_{N1}$, packet $B_{P2}$ is transmitted from node $B_{N2}$ to nodes $A_{N3}$, and packet $B_{P3}$ is transmitted from node $B_{N3}$ to node $C_{N2}$. Packets $B_{P1}$, $B_{P2}$, $B_{P3}$ are all transmitted during the same phase. Packet $C_{P1}$ is transmitted from node $C_{N1}$ to nodes $A_{N3}$ and $B_{N3}$, packet $C_{P2}$ is transmitted from node $C_{N2}$ to nodes an A-phase node and a B-phase node not shown in FIG. 3B. Packets $C_{P1}$ and $C_{P2}$ are transmitted during the same phase. Node $A_{N3}$ may receive packet $A_{P1}$ from node $A_{N1}$ using the distance-vector routing method described herein. Similarly, this distance-vector routing method described herein may enable efficient transmission of packet $B_{P1}$ from node $B_{N1}$ downstream to node $B_{N3}$ and/or transmission of packet $C_{P1}$ from node $C_{N1}$ downstream to node $C_{N2}$. It should be appreciated that this system enables packets to be transmitted in a more efficient manner, i.e. faster and using less data, by coupling two signals/data sets headed in the same direction into a single packet. While not described above in detail, it should be appreciated that in some embodiments, node $B_{N3}$ may be the center node of the second phase cluster (e.g., cluster $L_2$ of FIG. 3A.2), and node $A_{N3}$ may be the center node of the third phase cluster (e.g., cluster $L_3$ of FIG. 3A.3).

In some embodiments, to recover an intended packet, a recipient node may perform an XOR operation with a packet received during that phase and a packet received during a previous phase.

In one embodiment, during an N-iteration (i.e., first, second, third, etc.) of a first phase at $t=[x*(N-1)]+(x/3)$, node $A_{N1}$ transmits packet $A_{P1}$ to nodes $B_{N1}$ and $C_{N1}$. Next, during an N-iteration of a second phase at $t=[x*(N-1)]+(2x/3)$, node $B_{N1}$ transmits packet $B_{P1}$ to nodes $A_{N2}$ and $C_{N1}$. Then, during the N-iteration of a third phase at $t=[x*(N-1)]+x$, node $C_{N1}$ performs an XOR operation with packet $A_{P1}$, received during the first phase at $t=x/3$, and packet $B_{P1}$, received during the second phase at $t=[x*(N-1)]+(2x/3)$. The resulting product of the XOR operation is packet $C_{P1}$, which is uncovered at node $C_{N1}$, and may be transmitted from node $C_{N1}$ to nodes $A_{N3}$ and $B_{N3}$ at time $t=[x*(N-1)]+x$.

Next, an (N+1)-iteration (i.e., second, third, fourth, etc.) of the first phase occurs, $t=[x*(N-1)]+(x/3)$, and node $A_{N3}$ performs an XOR operation with packet $B_{P2}$, received during the N-iteration of the second phase, and packet $C_{P1}$, received during the N-iteration of the third phase. The resulting product of the XOR operation is packet $A_{P3}$, which is transmitted from node $A_{N3}$ to node $C_{N2}$ and B-phase node that is not pictured. In some embodiments, packet $A_{P3}$ is the same as packet $A_{P1}$, and thus this technique enables efficient transmission of packet $A_{P1}$ from node $A_{N1}$ to node $A_{N3}$. Next, the (N+1)-iteration of the second phase occurs at $t=[x*(N-1)]+(2x/3)$, and node $B_{N3}$ performs an XOR operation with packet $C_{P1}$, received during the N-iteration of the third phase, and packet $A_{P2}$, received during the N-iteration of the first phase. The resulting product of the XOR operation is packet $B_{P3}$, which is transmitted from node $B_{N3}$ to node $C_{N3}$ and an A-phase node that is not picture. In some embodiments, during this (N+1)-iteration of the second phase. Next, the (N+1)-iteration of the third phase occurs at $t=[x*(N-1)]+x$, and node $C_{N2}$ performs an XOR operation with packet $A_{P3}$, received during the (N+1)-iteration of the first phase, and packet $B_{P3}$, received during the (N+1)-iteration of the second phase. The resulting product of the XOR operation is packet $C_{P2}$, which is transmitted from node $C_{N2}$ to node a not pictured A-phase node and B-phase node.

This process may repeat, and employ additional A, B, and C-phase nodes and packets, until the packet arrives at its destination. For example, packet $A_{P1}$ may travel through a plurality of nodes during a plurality of phase iterations until it arrives at its destination of node $A_{N17}$.

More generally, the packet may be transmitted to and received by all adjacent nodes (each node may be in promiscuous mode). This enables packets to be transferred through the center node in opposite directions (or any directions) without compromising the phase synchronization. In some embodiments, an RSSI limit is set to determine the placement of the nodes within the network in order to disregard/ignore packets received from opposite nodes. In some embodiments, the adjacent nodes may be identified by determining the first 2-8 RSSI values following a "cliff". In some embodiments, the adjacent nodes may be identified by determining the six closest nodes (based on RSSI).

In some embodiments, during an iteration of a phase, a node may transmit a packet simultaneously while another node of the same phase transmits a different packet. For example, during an N-iteration of the first phase, node $A_{N1}$ transmits packet $A_{P1}$ while node $A_{N2}$ transmits packet $A_{P2}$ and/or node $A_{N3}$ transmits packet $A_{P3}$. However, it should be appreciated that in such an embodiment packets $A_{P1}$, $A_{P2}$, and/or $A_{P3}$ may be different packets and/or correspond to different data/signals.

In an example of this embodiment using binary examples of an XOR function, packet $A_{P1}$ contains data equal to a value of 0 and packet $B_{P1}$ contains data equal to a value of 0. Thus, in such an example, during the first phase at $t=x/3$, node $A_{N1}$ transmits packet $A_{P1}$ (a value of 0) to nodes $B_{N2}$ and $C_{N1}$. Next, during the second phase at $t=2x/3$, node $B_{N1}$ transmits packet $B_{P1}$ (a value of 0) to nodes $A_{N2}$ and $C_{N1}$. During the third phase at $t=x$, node $C_{N1}$ performs an XOR of packet $A_{P1}$ (a value of 0) and packet $B_{P1}$ (a value of 0) and transmits the resulting packet to nodes $A_{N3}$ and $B_{N3}$. Thus, packet $C_{P1}$ is transmitted with a value of 0 (0 XORed with 0=0). At the next iteration of the first phase, node $A_{N3}$ performs an XOR function with packets $B_{P2}$ (value of 0) and $C_{P1}$ (value of 0) to transmit packet $A_{P3}$ with a value of 0 (0 XOR with 0=0), to node $C_{N3}$. The packet received at node $A_{N3}$ is equal to the same value (0) as transmitted from node $A_{N1}$. In some scenarios, the packet transmitted at node $A_{N3}$ is equal to the same value (0) as transmitted from node $A_{N1}$. During a later iteration of the second phase at node $B_{N3}$, node $B_{N3}$ performs an XOR function with received packet $A_{P2}$ (value of 0) with packet $C_{P1}$ (value of 0) to transmit packet $B_{P3}$, with a value of 0 (0 XOR with 0=0), to node $C_{N2}$. Then, at the next iteration of the third phase at node $C_{N2}$, node $C_{N2}$ performs an XOR function with received packet $A_{P3}$ (value of 0) with packet $B_{P3}$ (value of 0) to transmit packet $C_{P2}$, with a value of 0 (0 XOR with 0=0). The packet received at node $C_{N2}$ is equal to the same value (0) as the packet transmitted from node $C_{N1}$ (0). In some embodiments, the packet transmitted at node $C_{N2}$ is equal to the same value (0) as the packet transmitted from node $C_{N1}$ (0).

In another example of this embodiment using binary examples of an XOR function, packet $A_{P1}$ contains data equal to a value of 1 and packet $B_{P1}$ contains data equal to a value of 0. Thus, in such an example, during the first phase at t=x/3, node $A_{N1}$ transmits packet $A_{P1}$ (a value of 1) to nodes $B_{N2}$ and $C_{N1}$. Next, during the second phase at t=2x/3, node $B_{N1}$ transmits packet $B_{P1}$ (a value of 0) to nodes $A_{N2}$ and $C_{N1}$. During the third phase at t=x, node $C_{N1}$ performs an XOR of packet $A_{P1}$ (a value of 1) and packet $B_{P1}$ (a value of 0) and transmits the resulting packet to nodes $A_{N3}$ and $B_{N3}$. Thus, packet $C_{P1}$ is transmitted with a packet with a value of 1 (1 XORed with 0=1). At the next iteration of the first phase, node $A_{N3}$ performs an XOR function with packets $B_{P2}$ (value of 0) and $C_{P1}$ (value of 1) to transmit packet $A_{P3}$ with a value of 1 (0 XOR with 1=1), to node $C_{N3}$. The packet received at node $A_{N3}$ is equal to the same value (1) as transmitted from node $A_{N1}$. In some embodiments, the packet transmitted at node $A_{N3}$ is equal to the same value (1) as transmitted from node $A_{N1}$. During a later iteration of the second phase at node $B_{N3}$, node $B_{N3}$ performs an XOR function with received packet $A_{P2}$ (value of 1) with packet $C_{P1}$ (value of 1) to transmit packet $B_{P3}$, with a value of 0 (1 XOR with 1=0), to node $C_{N2}$. Then, at the next iteration of the third phase at node $C_{N2}$, node $C_{N2}$ performs an XOR function with received packet $A_{P3}$ (value of 1) with packet $B_{P3}$ (value of 1) to transmit packet $C_{P2}$, with a value of 1 (1 XOR with 0=1). The packet received at node $C_{N2}$ is equal to the same value (1) as the packet transmitted from node $C_{N1}$ (1). In some embodiments, the packet transmitted at node $C_{N2}$ is equal to the same value (1) as the packet transmitted from node $C_{N1}$ (1).

In another example of this embodiment using binary examples of an XOR function, packet $A_{P1}$ contains data equal to a value of 0 and packet $B_{P1}$ contains data equal to a value of 1. Thus, in such an example, during the first phase at t=x/3, node $A_{N1}$ transmits packet $A_{P1}$ (a value of 0) to nodes $B_{N2}$ and $C_{N1}$. Next, during the second phase at t=2x/3, node $B_{N1}$ transmits packet $B_{P1}$ (a value of 1) to nodes $A_{N2}$ and $C_{N1}$. During the third phase at t=x, node $C_{N1}$ performs an XOR of packet $A_{P1}$ (a value of 0) and packet $B_{P1}$ (a value of 1) and transmits the resulting packet to nodes $A_{N3}$ and $B_{N3}$. Thus, packet $C_{P1}$ is transmitted with a value of 1 (0 XORed with 1=0). At the next iteration of the first phase, node $A_{N3}$ performs an XOR function with packets $B_{P2}$ (value of 1) and $C_{P1}$ (value of 0) to transmit packet $A_{P3}$ with a value of 1 (1 XOR with 0=1), to node $C_{N3}$. The packet received at node $A_{N3}$ is equal to the same value (1) as transmitted from node $A_{N1}$. In some embodiments, the packet received at node $A_{N3}$ is equal to the same value (1) as transmitted from node $A_{N1}$. During a later iteration of the second phase at node $B_{N3}$, node $B_{N3}$ performs an XOR function with received packet $A_{P2}$ (value of 1) with packet $C_{P1}$ (value of 0) to transmit packet $B_{P3}$, with a value of 1 (1 XOR with 0=1), to node $C_{N2}$. Then, at the next iteration of the third phase at node $C_{N2}$, node $C_{N2}$ performs an XOR function with received packet $A_{P3}$ (value of 1) with packet $B_{P3}$ (value of 1) to transmit packet $C_{P2}$, with a value of 0 (1 XOR with 1=0). The packet received at node $C_{N2}$ is equal to the same value (0) as the packet transmitted from node $C_{N1}$ (0). In some embodiments, the packet transmitted at node $C_{N2}$ is equal to the same value (0) as the packet transmitted from node $C_{N1}$ (0).

FIG. 3C.1 illustrates an embodiment of a first phase of a communication network. The components illustrated in FIG. 3C.1 correspond to and operate in a similar manner to FIG. 3B. The first phase occurs in iterations of t=x/3. During the first phase, nodes $A_{N1}$, $A_{N2}$, $A_{N3}$, $A_{N4}$, and $A_{N5}$ transmit packets $A_{P1}$, $A_{P2}$, $A_{P3}$, $A_{P4}$, and $A_{P5}$ (not shown) respectively, In some embodiments, packets $A_{P1}$, $A_{P2}$, $A_{P3}$, $A_{P4}$, and/or $A_{P5}$ may be transmitted at different iterations of the first phase. Whereas in other embodiments, packets $A_{P1}$, $A_{P2}$, $A_{P3}$, $A_{P4}$, and/or $A_{P5}$ may be transmitted during the same iteration of the first phase.

FIG. 3C.2 illustrates an embodiment of a second phase of a communication network. The components illustrated in FIG. 3C.2 correspond to and operate in a similar manner to FIG. 3B. The second phase occurs in iterations of t=2x/3. During the second phase, nodes $B_{N1}$, $B_{N2}$, $B_{N3}$, $B_{N4}$, and $B_{N5}$ transmit packets $B_{P1}$, $B_{P2}$, $B_{P3}$, $B_{P4}$, and $B_{P5}$ (not shown), respectively, In some embodiments, packets $B_{P1}$, $B_{P2}$, $B_{P3}$, $B_{P4}$, and/or $B_{P5}$ may be transmitted at different iterations of the second phase. Whereas in other embodiments, packets $B_{P1}$, $B_{P2}$, $B_{P3}$, $B_{P4}$, and/or $B_{P5}$ may be transmitted during the same iteration of the second phase.

FIG. 3C.3 illustrates an embodiment of a third phase of a communication network. The components illustrated in FIG. 3C.3 correspond to and operate in a similar manner to FIG. 3B. The third phase occurs in iterations of t=x. During the third phase, nodes $C_{N1}$, $C_{N2}$, $C_{N3}$, and $C_{N4}$ transmit packets $C_{P1}$, $C_{P2}$, $C_{P3}$, and $C_{P4}$, respectively. In some embodiments, packets $C_{P1}$, $C_{P2}$, $C_{P3}$, and/or $C_{P4}$ may be transmitted at different iterations of the third phase. Whereas in other embodiments, packets $C_{P1}$, $C_{P2}$, $C_{P3}$, and/or $C_{P4}$ may be transmitted during the same iteration of the third phase.

FIG. 4A.1 illustrates an embodiment of a first cluster of a four-phase communication network. As FIG. 4A.1 illustrates the communication network 400, and may operate in a manner as described above with respect to phase synchronization. The communication network 400 may include a plurality of nodes $A_{N1}$, $A_{N2}$, $A_{N3}$, $A_{N4}$, $B_{N1}$, $B_{N2}$, $B_{N3}$, $B_{N4}$, $C_{N1}$, $C_{N2}$, $C_{N3}$, $D_{N1}$, $D_{N2}$, and $D_{N3}$. It should be appreciated that the communication network 400 may include just some of the nodes $A_{N1}$, $A_{N2}$, $A_{N3}$, $A_{N4}$, $B_{N1}$, $B_{N2}$, $B_{N3}$, $B_{N4}$, $C_{N1}$, $C_{N2}$, $C_{N3}$, $D_{N1}$, $D_{N2}$, and $D_{N3}$, or may include additional nodes. In some embodiments, each of $A_{N1}$, $A_{N2}$, $A_{N3}$, $A_{N4}$, $B_{N1}$, $B_{N2}$, $B_{N3}$, $B_{N4}$, $C_{N1}$, $C_{N2}$, $C_{N3}$, $D_{N1}$, $D_{N2}$, and $D_{N3}$ may be the device 110 as described above in connection with FIGS. 1A and 1B. In some embodiments, the nodes may transmit packets as described above in connection with FIG. 2. In some embodiments, a plurality of nodes may comprise a cluster. For example, in this embodiment, nodes $A_{N1}$, $A_{N2}$, $B_{N1}$, $B_{N3}$, $C_{N1}$, $D_{N1}$, and $D_{N2}$, comprise cluster $L_1$, with node $C_{N1}$ serving as the center node of the cluster $L_{44}$. The center node of the cluster may be configured to buffer packets so as to route non-overlapping adjacent clusters synchronously. In some embodiments, network coding enables a center node to simultaneously transmit multiple packets within a cluster.

FIG. 4A.2 illustrates an embodiment of a second cluster of a four-phase communication network. FIG. 4A.2 illustrates the communication network 400, and may operate in a manner as described above with respect to phase synchronization. The components illustrated in FIG. 4A.2 correspond to and operate in the same manner as the like-numbered components shown in FIG. 4A.1. In some embodiments, a plurality of nodes may comprise a cluster. For example, in this embodiment, nodes $A_{N2}$, $A_{N4}$, $B_{N3}$, $B_{N4}$, $C_{N2}$, $C_{N2}$, and $D_{N3}$ comprise cluster $L_2$, with node $D_{N3}$ serving as the center node of the cluster $L_2$.

FIG. 4A.3 illustrates an embodiment of a third cluster of a four-phase communication network. FIG. 4A.3 illustrates the communication network 400, and may operate in a manner as described above with respect to phase synchronization. The components illustrated in FIG. 4A.3 correspond to and operate in the same manner as the like-numbered components shown in FIGS. 4A.1 and 4A.2. In some embodiments, a plurality of nodes may comprise a cluster. For example, in this embodiment, nodes $A_{N2}$, $B_{N2}$, $B_{N3}$, $C_{N1}$, $C_{N2}$, $D_{N1}$, and $D_{N3}$ comprise cluster $L_3$, with node $A_{N3}$ serving as the center node of the cluster $L_3$.

FIG. 4A.4 illustrates an embodiment of a fourth cluster of a four-phase communication network. FIG. 4A.4 illustrates the communication network 400, and may operate in a manner as described above with respect to phase synchronization. The components illustrated in FIG. 4A.4 correspond to and operate in the same manner as the like-numbered components shown in FIGS. 4A.1, 4A.2, and 4A.3. In some embodiments, a plurality of nodes may comprise a cluster. For example, in this embodiment, nodes $A_{N2}$, $A_{N3}$, $B_{N3}$, $C_{N1}$, $C_{N3}$, $D_{N2}$, and $D_{N3}$ comprise cluster $L_4$, with node $B_{N3}$ serving as the center node of the cluster $L_4$.

Figure 4B:
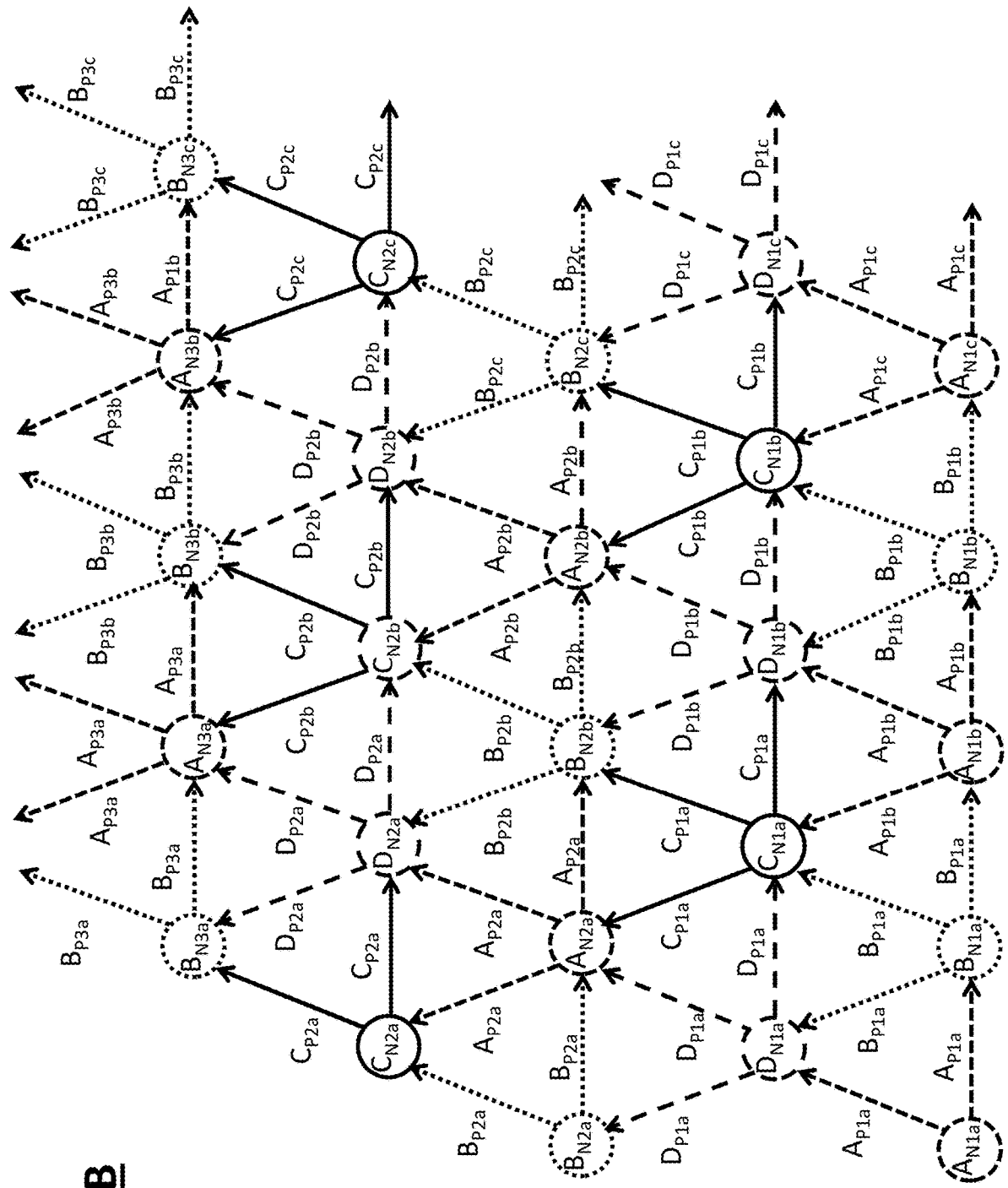
FIG. 4B illustrates an embodiment of a four phase synchronization communication network.

FIG. 4B illustrates an embodiment of a four phase synchronization communication network. As FIG. 4B illustrates, the communication network 400 may include nodes $A_{N1a}$, $A_{N1b}$, $A_{N1c}$, $A_{N2a}$, $A_{N2b}$, $A_{N3a}$, $A_{N3b}$, $B_{N1a}$, $B_{N1b}$, $B_{N2a}$, $B_{N2b}$, $B_{N2c}$, $B_{N3a}$, $B_{N3b}$, $B_{N3c}$, $C_{N1a}$, $C_{N1b}$, $C_{N2a}$, $C_{N2b}$, $C_{N2c}$, $D_{N1a}$, $D_{N1b}$, $D_{N1c}$, $D_{N2a}$, and $D_{N2b}$. It should be appreciated that the communication network 400 may include just some of the nodes $A_{N1a}$, $A_{N1b}$, $A_{N1c}$, $A_{N2a}$, $A_{N2b}$, $A_{N3a}$, $A_{N3b}$, $B_{N1a}$, $B_{N1b}$, $B_{N2a}$, $B_{N2b}$, $B_{N2c}$, $B_{N3a}$, $B_{N3b}$, $B_{N3c}$, $C_{N1a}$, $C_{N1b}$, $C_{N2a}$, $C_{N2b}$, $C_{N2c}$, $D_{N1a}$, $D_{N1b}$, $D_{N1c}$, $D_{N2a}$, and $D_{N2b}$, or may include more nodes (e.g., $A_{N4a}$, $B_{N4a}$, $C_{N3d}$, $D_{N4d}$, etc.). The communication network 400 may also include packets $A_{P1a}$, $A_{P1b}$, $A_{P1c}$, $A_{P2a}$, $A_{P2b}$, $A_{P3a}$, $A_{P3b}$, $A_{P3c}$, $B_{P1a}$, $B_{P1b}$, $B_{P2a}$, $B_{P2b}$, $B_{P2c}$, $B_{P3a}$, $B_{P3b}$, $B_{P3c}$, $C_{P1a}$, $C_{P1b}$, $C_{P2a}$, $C_{P2b}$, $C_{P2c}$, $D_{P1a}$, $D_{P1b}$, $D_{P1c}$, $D_{P2a}$, and $D_{P2b}$. In this embodiment, node $C_{N1a}$ operates as the center node of a first phase cluster (e.g., cluster $L_1$ of FIG. 4A.1) created by nodes $A_{N1b}$, $A_{N2b}$, $B_{N1a}$, $B_{N2a}$, $D_{N1a}$, and $D_{N1b}$. As illustrated, packets are transmitted from nodes to adjacent nodes as described in FIG. 3B. For example, packet $A_{P1b}$ is transmitted from node $A_{N1b}$ to nodes $B_{N1b}$, $C_{N1a}$, and $D_{N1b}$; packet $B_{P1a}$ is transmitted from node $B_{N1a}$ to nodes $A_{N1b}$, $C_{N1a}$, and $D_{N1a}$; packet $C_{P1a}$ is transmitted from node $C_{N1a}$ to nodes $A_{N2a}$, $B_{N2b}$, and $D_{N1b}$; and packet $D_{P1a}$ is transmitted from node $D_{N1a}$ to nodes $A_{N2a}$, $B_{N2a}$, and $C_{N1a}$. Accordingly, the distance-vector routing method described herein may enable efficient transmission of packets through the communication network 400. It should be appreciated that this system enables packets to be transmitted in a more efficient manner, i.e. faster and using less data, by coupling three signals/data sets headed in the same direction into a single packet. While not described above in detail, it should be appreciated that in some embodiments, node $D_{N1b}$ may be the center node of the second phase cluster (e.g., cluster $L_2$ of FIG. 4A.2), node $A_{N2a}$ may be the center node of the third phase cluster (e.g., cluster $L_3$ of FIG. 4A.3), and node $B_{N2b}$ may be the center node of the fourth phase cluster (e.g., cluster $L_4$ of FIG. 4A.4).

In some embodiments, to recover an intended packet, a recipient node may perform an XOR operation with a packet received during that phase, a packet received during a previous phase, and a third packet received during the second to last previous phase.

In one embodiment, during an N-iteration (i.e., first, second, third, etc.) of a first phase at $t=[x*(N-1)]+(x/4)$, node $A_{N1b}$ transmits packet $A_{P1b}$ to nodes $B_{N1b}$, $C_{N1a}$, and $D_{N1b}$. Next, during an N-iteration of a second phase at $t=[x*(N-1)]+(x/2)$, node $B_{N1a}$ transmits packet $B_{P1a}$ to nodes $A_{N1b}$, $C_{N1a}$, and $D_{N1a}$. Next, during the N-iteration of a third phase at $t=[x*(N-1)]+(3x/4)$, node $D_{N1a}$ transmits packet $D_{P1a}$ to nodes $A_{N2a}$, $B_{N2a}$, and $C_{N1a}$. Then during the N-iteration of a fourth phase at $t=[x*(N-1)]+x$, node $C_{Na1}$ performs an XOR operation with packet $A_{P1a}$, received during the first phase, packet $B_{P1a}$ received during the second phase, and packet $D_{P1a}$ received during the third phase. The resulting product of the XOR operation is packet $C_{P1a}$, which may uncovered at node $C_{N1a}$, and may be transmitted from node $C_{N1a}$ to nodes $A_{N3}$ and $B_{N3}$ at time $t=[x*(N-1)]+x$.

Next, an (N+1)-iteration (i.e., second, third, fourth, etc.) of the first phase occurs, $t=[x*(N-1)]+(x/4)$, and node $A_{N2a}$ performs an XOR operation with packet $B_{P2a}$, received during the N-iteration of the second phase, packet $C_{P1a}$, packet $D_{P1a}$, received during the N-iteration of the third phase, and packet $C_{P1a}$, received during the N-iteration of the fourth phase. The resulting product of the XOR operation is packet $A_{P2a}$, which may be transmitted from node $A_{N2a}$ to nodes $B_{N2b}$, $C_{N2a}$, and $D_{N2a}$. In some embodiments, packet $A_{P2a}$ is the same as packet $A_{P1b}$, and thus this technique enables efficient transmission of packet $A_{P1b}$ from node $A_{N1b}$ to node $A_{N2a}$. This process may repeat, and employ additional A, B, C, and D-phase nodes and packets, until the packet arrives at its destination. For example, packet $A_{P1b}$ may travel through a plurality of nodes during a plurality of phase iterations until it arrives at its destination of node $A_{N17d}$.

While not shown, it should be appreciated that the packet may be transmitted to and received by all adjacent nodes (each node may be in promiscuous mode). This enables packets to be transferred through the center node in opposite directions (or any directions) without compromising the phase synchronization. In some embodiments, an RSSI limit is set to determine the placement of the nodes within the network in order to disregard/ignore packets received from opposite nodes. In some embodiments, the adjacent nodes may be identified by determining the first 2-8 RSSI values following a "cliff". In some embodiments, the adjacent nodes may be identified by determining the six closest nodes (based on RSSI).

In some embodiments, during an iteration of a phase, a node may transmit a packet simultaneously while another node of the same phase transmits a different packet. For example, during an N-iteration of the first phase, node $A_{N1b}$ transmits packet $A_{P1b}$ while node $A_{N2c}$ transmits packet $A_{P2c}$. However, it should be appreciated that in such an embodiment packets $A_{P1b}$ and/or $A_{P2c}$ may be different packets and/or correspond to different data/signals.

FIG. 4C.1 illustrates an embodiment of a first phase of a communication network. The components illustrated in FIG. 4C.1 correspond to and operate in a similar manner to FIG. 4B. The first phase occurs in iterations of $t=[x*(N-1)]+(x/4)$, where N is an integer value corresponding to the iteration number of the phase. During the first phase, nodes $A_{N1}$, $A_{N2}$, $A_{N3}$, and $A_{N4}$ transmit packets $A_{P1}$, $A_{P2}$, $A_{P3}$, and $A_{P4}$ (not shown) respectively, In some embodiments, packets $A_{P1}$, $A_{P2}$, $A_{P3}$, and/or $A_{P4}$ may be transmitted at different iterations of the first phase. Whereas in other embodiments, packets $A_{P1}$, $A_{P2}$, $A_{P3}$, and/or $A_{P4}$ may be transmitted during the same iteration of the first phase.

FIG. 4C.2 illustrates an embodiment of a second phase of a communication network. The components illustrated in FIG. 4C.2 correspond to and operate in a similar manner to FIG. 4B. The second phase occurs in iterations of $t=[x*(N-1)]+(x/2)$, where N is an integer value corresponding to the iteration number of the phase, nodes $B_{N1}$, $B_{N2}$, $B_{N3}$, and $B_{N4}$, transmit packets $B_{P1}$, $B_{P2}$, $B_{P3}$, and $B_{P4}$, respectively, In some embodiments, packets $B_{P1}$, $B_{P2}$, $B_{P3}$, and/or $B_{P4}$ may be transmitted at different iterations of the second phase. Whereas in other embodiments, packets $B_{P1}$, $B_{P2}$, $B_{P3}$, and/or $B_{P4}$ may be transmitted during the same iteration of the second phase.

FIG. 4C.3 illustrates an embodiment of a third phase of a communication network. The components illustrated in FIG. 4C.3 correspond to and operate in a similar manner to FIG. 4B. The third phase occurs in iterations of $t=[x*(N-1)]+(3x/4)$, where N is an integer value corresponding to the iteration number of the phase. During the third phase, nodes $C_{N1}$, $C_{N2}$, $C_{N3}$, and $C_{N4}$ transmit packets $C_{P1}$, $C_{P2}$, and $C_{P3}$, respectively. In some embodiments, packets $C_{P1}$, $C_{P2}$, and/or $C_{P3}$ may be transmitted at different iterations of the third phase. Whereas in other embodiments, packets $C_{P1}$, $C_{P2}$, and/or $C_{P3}$ may be transmitted during the same iteration of the third phase.

FIG. 4C.4 illustrates an embodiment of a fourth phase of a communication network. The components illustrated in FIG. 4C.4 correspond to and operate in a similar manner to FIG. 4B. The fourth phase occurs in iterations of $t=[x*(N-1)]+(x)$, where N is an integer value corresponding to the iteration number of the phase. During the third phase, nodes $D_{N1}$, $D_{N2}$, and $D_{N3}$ transmit packets $D_{P1}$, $D_{P3}$, and $D_{P3}$, respectively. In some embodiments, packets $D_{P1}$, $D_{P2}$, and/or $D_{P3}$ may be transmitted at different iterations of the fourth phase. In other embodiments, packets $D_{P1}$, $D_{P2}$, and/or $D_{P4}$ may be transmitted during the same iteration of the fourth phase.

Data Aggregation for Distributed Optimization Method

Generally speaking, a network device of this disclosure can receive, from a peer network device, a packet travelling to a destination device identified in the header or elsewhere in the packet. When the packet carries informational payload for a destination device (e.g., application-layer data), the packet can be referred to as a data packet. The network device can determine which entries corresponding to respective routing paths (of which the network device may have only partial knowledge) specify the same destination device. The network device then can select a routing path based on the priorities assigned to the routing paths. The priorities in turn can be established based on the corresponding aggregate routing path information. More specifically, the network device can aggregate information about past performance of packets transmitted along certain routing paths to determine how well the particular routing paths are likely to service packets in the future. Where multiple routing paths are available for the same destination, the network device then can select a node of the routing path with the highest priority.

In addition to carrying informational payload, a data packet transmitted between a pair of nodes can serve as an indication of link quality. The network device thus can aggregate the indication of link quality into the link characteristics for the link via which the data packet arrived. For example, the network device can process a timestamp of the data packet to assess the propagation delay of the link, check the bit-error rate, measuring the signal-to-noise ratio, etc. In some embodiments, each data packet can carry additional information regarding the transmitting node (e.g., signal strength) which the network device receiving the data packet can use to update the aggregate link characteristics. In a similar manner, a network device can utilize a packet of any other type (e.g., an update packet, a NACK packet) to update link characteristics.

Further, and as discussed in more detail below, successful delivery of a data packet can trigger an update that propagates backward along the routing path from the destination device. Network devices receiving the update can aggregate the new information into the characteristics for the routing path. Thus, when a data packet travels to a destination device D sequentially via nodes A, B, and C, node C will receive the corresponding update from the destination device first, generate an update packet for node B, and node B in turn will generate an update packet for node A upon receiving the update from node C.

Moreover, update receiving an update, a node disposed along the routing path can provide an update of its entry of the routing table related to the routing path to its neighbors, including those that were not on the routing path. For example, if a packet traveled via nodes A, B, and C on its way to the destination device, node B can send an update related to the routing to its neighbors E and F. The neighbors E and F in turn can update their routing tables using the new path information. As a more specific example, if neighbor node E already has an entry in its routing table indicating that destination D is reachable via its neighbor node B, node E can aggregate the routing path characteristics into the routing path characteristics previously accumulated for this entry and update the priority of the entry, as necessary; and if neighbor node F previously was unaware that destination D is reachable via its neighbor node B, node F can create a new entry in its routing table. The new entry can include an indication that destination D is reachable via B, the characteristics of the routing path ascertained from the update packet received from node B, and an initial priority value assigned to the entry based on these characteristics. In one embodiment, to prevent the update packets from flooding the communication network with new data, nodes E and F do not forward the new routing information to their neighbors.

Thus, an update propagating back from a destination device upon delivery of a data packet can operate as a limited broadcast rather than a network-wide broadcast. As one alternative to these techniques, the destination device can limit the number of nodes to which the update packet travels by assigning a certain time-to-live (TTL) value to the update packet, so that the update packet typically reaches only a limited number of nodes.

As a more specific example, FIG. 5 illustrates a method 500 for optimized transmission of a packet through a wireless communication network. The method 500 may be implemented as described above in connection with FIGS. 1A, 1B, 1C, and 2. Accordingly, the method 500 may be partially or completely implemented in the device 110.

In the method 500, a data packet is received by a second node (e.g., the device 110 of FIGS. 1A and 1B), via a transceiver (e.g., the transceiver 132 of FIG. 1A), from a first node (e.g., the node 199 of FIG. 1B), and the adjacent node link characteristics of the second node are updated (block 510). Depending on the embodiment and/or scenario, the second node can adjust the link characteristics based on the information at the PHY layer, the link layer, the transport layer, or any suitable combination thereof. The adjacent link characteristics of the second node may be updated by the CPU executing link characteristic program instructions stored in a memory storage (e.g., the link characteristic update program memory storage 136) and stored in a memory storage (e.g. the adjacent node memory storage 145). Examples of link characteristics that may be updated include, but are not limited to a number of hops/jumps between nodes, delay, packet loss, packet window, throughput, and/or encoding, as discussed above In addition to updating link characteristics, the second node can update the characteristics for a routing path.

The packet is analyzed to determine whether the packet is a data packet or an update packet (block 515). In one embodiment, the packet header is analyzed, by the CPU executing packet type detection program instructions stored in a memory storage (e.g., the packet type detection program memory storage 142 of FIG. 1A), to determine whether the packet is a data packet or an update packet. When the packet is determined by the CPU to be an update packet, the method proceeds to block 520. However, when the packet is determined by the CPU to be a data packet, the method proceeds to block 530.

In response to determining the packet is an update packet at block 515, the CPU determines whether the packet has recently traveled through the second node (block 520). In one embodiment, whether the packet has recently traveled though the node may be determined by the CPU comparing the packet ID number of the packet, which may be stored in a memory storage unit (e.g., the packet ID memory storage 141 of FIG. 1A), with data stored in a routing memory storage (e.g., the routing memory storage 144 of FIG. 1A). When the numeric value corresponding to the packet ID number of the received packet is the same numeric value as one or more entries in the routing memory storage, then the packet has recently traveled through the node. When it has been determined that the packet has recently been through the node, existing data contained in the routing memory storage may be updated/revised/replaced with the data contained in the packet (block 525). In some embodiments, the data contained in the routing memory storage may be updated with regard to destination addresses, next-node MAC addresses, adjacent node MAC addresses, priority numbers, aggregate path characteristics, link characteristics, and/or other network-related data.

After the data contained in the routing memory storage has been updated, the packet is then transmitted, after being converted/translated back to the physical layer from the link layer, to all adjacent nodes (block 526). In some embodiments, the update packet is transmitted via a transceiver (e.g., the transceiver 132 of FIG. 1A). In some embodiments, the identity of the adjacent nodes, to transmit the packet to, is determined by the CPU executing adjacent node determination program instructions stored in a memory storage (e.g., the adjacent node determination program memory 146 of FIG. 1A). In some embodiments, the identity of adjacent nodes may be stored in a memory storage (e.g., the adjacent node memory storage 145).

However, it is determined that the packet has not recently traveled through the second node when the CPU determines that the numeric value corresponding to the packet ID number of the received packet is not the same numeric value as any of the entries in the routing memory storage. When it has been determined that the packet has not been through the second node, data corresponding to the packet, such as the packet ID number of the received packet, is added to the routing memory storage (block 522).

However, when the packet is determined to be a data packet at block 415, the packet is analyzed to determine if the destination address of the packet is in the routing memory storage of the second node (block 530). In some embodiments, the packet is analyzed by the CPU executing retransmit detection program instruction stored in a memory storage (e.g., the retransmit detection program memory storage 138) which may be configured to compare data contained in the received packet corresponding to the destination address of the packet with destination address data stored in the routing memory storage. When it is determined that the destination address of the received packet, or data corresponding to the destination address of the received packet, is contained in the routing memory storage, then method 500 proceeds to block 550. However, when it is determined that the destination address of the received packet, or data corresponding to the destination address of the received packet, is not contained in the routing memory storage, a NACK signal (negative acknowledgement) is transmitted by the transceiver back to the first node that transmitted the packet (e.g., node 199 of FIG. 1B) to the second node (block 540).

After the first node receives the NACK from the second node, the packet is resent to a node with next highest priority (block 545). In some embodiments, data corresponding to an order/priority for transmitting packets to one or more nodes in a communication network may be stored in a routing memory storage of the first node. In some embodiments, the order/priority of nodes to receive a packet is determined by executing program instructions stored in a memory storage (e.g., the next node priority determination program storage 148). When the node with the highest priority, behind the second node, is determined, the first node resends the packet to the node determined to have the highest priority.

When it is determined that the destination address of the received packet, or data corresponding to the destination address of the received packet is contained in the routing memory storage, the packet is forwarded (block 550). To determine a node to receive the packet from the second node, next node priority determination program instructions stored in a program memory (e.g., next node priority determining program memory 148) may be executed by the CPU. In some embodiments, the priority of nodes to receive a packet from the second node may be stored in the routing memory storage. In determining a node to receive the packet, the routing memory storage may be analyzed to determine if the node with the highest priority is the same node as the first node (e.g., node 199) that originally transmitted the packet to the second node (block 550).

When it is determined that the node (e.g., node 299 of FIG. 1B) with the highest priority is not the same as the first node, the packet is transmitted, via the transceiver, to the node with the highest priority. However, when it is determined that the node with the highest priority (e.g., node 199 of FIG. 1B) is the same node as the first node (e.g., node 199), the routing memory storage unit is analyzed to determine the node with the second highest priority (e.g., node 299), and the packet is transmitted, via the transceiver, to the node with the second highest priority (block 570).

In some embodiments, the method 500 may repeat until the packet is delivered to the destination client. After the packet is delivered to the destination client, the last node to receive the packet may broadcast an update packet, containing data contained in its own routing memory storage (such as MAC addresses and packet ID numbers), to one or more nodes in the communication network. It should be appreciated that the packet, or data contained within the packet, is converted/translated back to the physical layer from the link layer before the packet is transmitted by the transceiver to another device/node.

Clustered Synchronization Method

Figure 6:
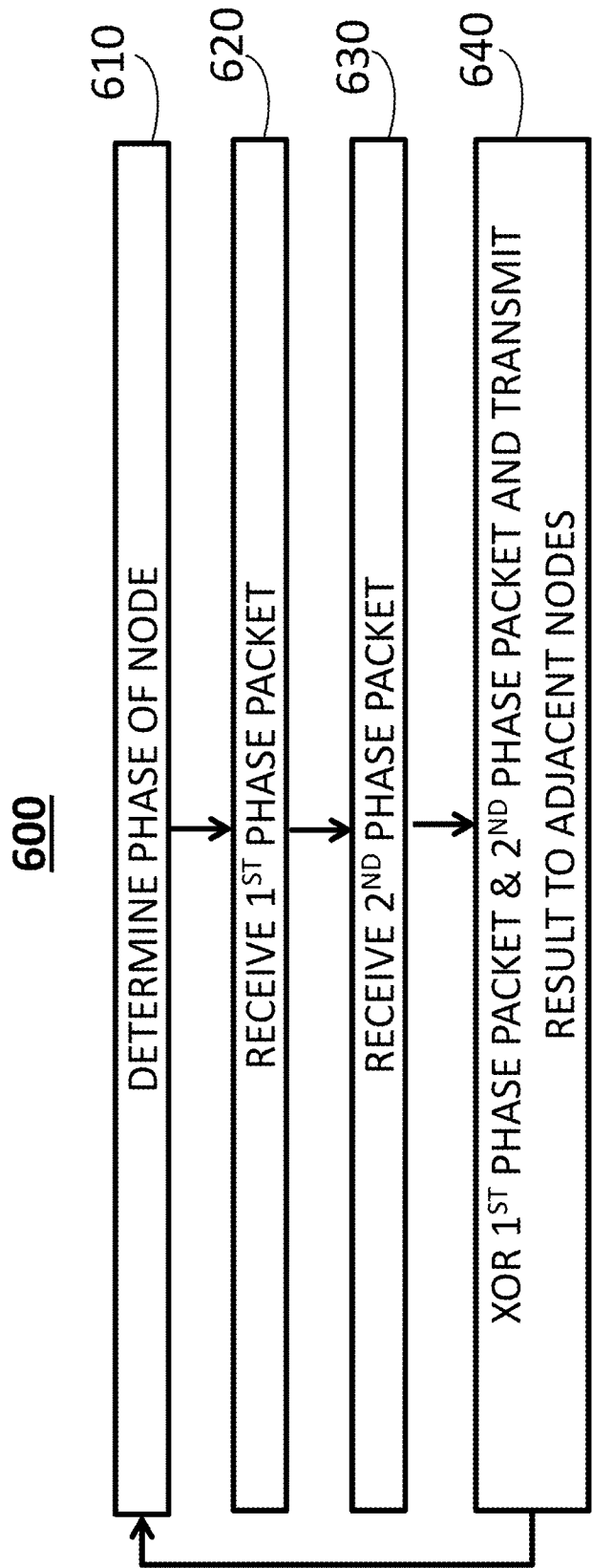
FIG. 6 illustrates a method for transmitting a plurality of packets through a communication network using phased synchronization.

FIG. 6 illustrates a method 600 for transmitting a plurality of packets through a communication network using phased synchronization. The method 600 may be implemented as described above in connection with FIGS. 1A, 1B, 1D, 3A.1, 3A.2, 3A.3, 3B, 3C.1, 3C.2 and 3C.3.

In the method 600, a phase representation of a node (e.g., the device 110 of FIG. 1A) is determined (block 610). The phase representation of the node is determined when phase determination program instructions stored in a memory storage (e.g., the phase determination program memory storage 152) are executed by a CPU (e.g., via the CPU 120 of FIG. 1A).

Once the phase representation of the node has been determined, the node receives a first phase packet (block 620). The first packet is received via a transceiver (e.g., the transceiver 132) during an (N+1)-phase and stored in a memory storage (e.g., the (N+1)-phase memory storage 155).

Next, the node receives a second phase packet (block 630). The second packet is received via the transceiver during an (N+2)-phase and stored in a memory storage (e.g., the (N+2)-phase memory storage 156).

After the first phase packet and second phase packet are received at the node, the first phase packet and second phase packet are XORed and the result is transmitted to one or more adjacent nodes during the third phase (block 640). Network coding program instructions stored in a memory store (e.g., the network coding program memory storage 158) are executed by the CPU to perform an XOR operation with the first phase packet and the second phase packet. The third phase packet, generated as a result of the XOR operation, may be stored in a memory storage (e.g. the N-phase memory storage 154) and transmitted by the transceiver to one or more downstream nodes.

In some embodiments, the method 600 may repeat until a packet is delivered to the intended destination client. It should be appreciated that the packets, or data contained within the packets, is converted/translated from the physical layer to the link layer when received by a device/node, and then converted/translated back to the physical layer from the link layer before being transmitted to other devices/nodes.

Figure 7:
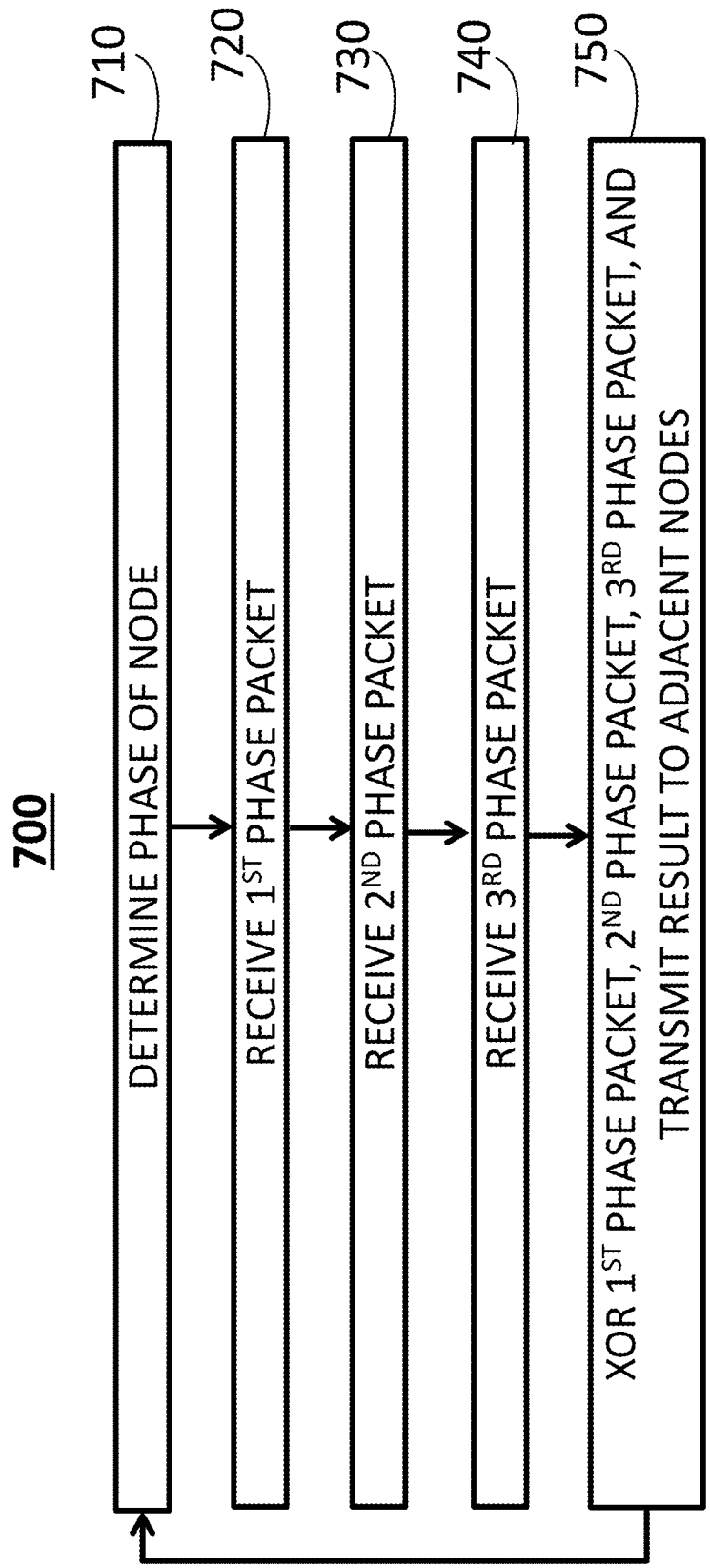
FIG. 7 illustrates a method for transmitting a plurality of packets through a communication network using a four-phase synchronization.

FIG. 7 illustrates a method 700 for transmitting a plurality of packets through a communication network using a four-phase synchronization. The method 700 may be implemented as described above in connection with FIGS. 1A, 1B, 1C, 4A.1, 4A.2, 4A.3, 4A.4, 4B, 4C.1, 4C.2, 4C.3, and 4C.4.

In the method 700, a phase representation of a node (e.g., the device 110 of FIG. 1A) is determined (block 610). The phase representation of the node is determined when phase determination program instructions stored in a memory storage (e.g., the phase determination program memory storage 152) are executed by a CPU (e.g., via the CPU 120 of FIG. 1A).

Once the phase representation of the node has been determined, the node receives a first phase packet (block 720). The first packet is received via a transceiver (e.g., the transceiver 132) during an (N+1)-phase and stored in a memory storage (e.g., the (N+1)-phase memory storage 155).

Next, the node receives a second phase packet (block 730). The second packet is received via the transceiver during an (N+2)-phase and stored in a memory storage (e.g., the (N+2)-phase memory storage 156).

Next, the node receives a third phase packet (block 740). The third packet is received via the transceiver during an (N+3)-phase and stored in a memory storage.

After the first phase packet, the second phase packet, and the third phase packet are received at the node, the first phase packet, the second phase packet, and the third phase packet are XORed and the result is transmitted to one or more adjacent nodes during the fourth phase (block 750). Network coding program instructions stored in a memory store (e.g., the network coding program memory storage 158) are executed by the CPU to perform an XOR operation with the first phase packet, the second phase packet, and the third phase packet. The fourth phase packet, generated as a result of the XOR operation, may be stored in a memory storage (e.g. the N-phase memory storage 154) and transmitted by the transceiver to one or more downstream nodes.

In some embodiments, the method 700 may repeat until a packet is delivered to the intended destination client. It should be appreciated that the packets, or data contained within the packets, is converted/translated from the physical layer to the link layer when received by a device/node, and then converted/translated back to the physical layer from the link layer before being transmitted to other devices/nodes.

It should be appreciated that in some embodiments, the method 500 and the method 600 or method 700 may be executed simultaneously/in conjunction with one another.

In some embodiments, machine learning techniques may also, or instead, be utilized to making network routing decisions. The link characteristics, packet type, phase representation identity, next node, node order/priority to receive a packet, or other communication network related parameters/data may be detected/determined using machine learning techniques, such as cognitive learning, deep learning, combined learning, heuristic engines and algorithms, and/or pattern recognition techniques. For example, the CPU 120 may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (e.g., link characteristics) in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, network, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning. The machine learning programs may also run simulations, using historical and/or or theoretical data, in furtherance of improving and/or monitoring node/network health and performance.

In supervised machine learning, a processing element (e.g., the CPU 120) may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data relating to one or more devices/nodes, phase representation of a device/node, network health distribution, throughput/delay/packet loss to an end user, geolocation information, image data, communication network data (e.g., an Ad-Hoc/Mesh network), a third-party database, and/or other data.

In one embodiment, a processor (and/or machine learning or heuristic engine or algorithm discussed herein) may be trained by providing it with a large sample of data with known characteristics or features, such as routing path characteristics. Based upon these analyses, the processing element may learn how to identify characteristics and patterns that may then be applied to analyzing user device details, node details, link characteristics, communication network details, geolocation information, image data, a third-party database, and/or other data. For example, the processing element may learn to automatically route a packet using the techniques described herein. The processing element may also recommend/suggest or predict a next node to receive a packet, a phase representation of a node, and/or an entire routing path for a packet.

The processing element and/or machine learning algorithm may also determine when devices/nodes have been added/removed from a communication network. Machine learning algorithms and/or techniques may be utilized to analyze and predict demand, supply, and/or congestion within an existing and/or new communication network.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed:

1. A wireless mesh network comprising:
a phase synchronization module to determine a full-phase x-second long iteration comprising N consecutive, non-overlapping phases including a first phase, a second phase, and a third phase, wherein each of the first, second, and third phases are x/N seconds long;
a first node configured to transmit a first packet during the first phase, wherein the first node is configured to transmit only during the first phase, and wherein the first node is configured to receive packets during the second and third phases;
a second node configured to transmit a second packet during the second phase, wherein the second node is configured to transmit packets only during the second phase, and wherein the second node is configured to receive packets during the first and third phases;
a third node configured to:
receive, during the first phase, the first packet from the first node,
receive, during the second phase, the second packet from the second node,
apply an exclusive-or (XOR) operation to the first packet and the second packet to generate a third packet, and
send, during the third phase, the third packet to a first adjacent node and a second adjacent node, via respective direct links, wherein
the third node is configured to transmit packets only during the third phase, and wherein the third node is configured to receive packets during the first and second phases.

2. The wireless mesh network of claim 1, wherein the first adjacent node is further configured to:
receive, during the second phase, a second phase packet,
receive, during the third phase from the third node, the third packet;
apply an exclusive-or (XOR) operation to the second phase packet and the third packet;
retrieve, as a result of applying the exclusive-or operation, the first packet.

3. The wireless mesh network of claim 1, wherein the second adjacent node is further configured to:
receive, during the first phase, a first phase packet,
receive, during the third phase from the third node, the third packet;
apply an exclusive-or (XOR) operation to the first phase packet and the third packet;
retrieve, as a result of applying the exclusive-or operation, the second packet.

4. The wireless mesh network of claim 1, wherein the third node is configured to be a center node of a first phase network hexagonal tessellation,
the first adjacent node is configured to be a center node of a second phase network hexagonal tessellation,
the second adjacent node is configured to be a center node of a third phase network hexagonal tessellation, and
the first phase hexagonal network tessellation, second phase hexagonal network tessellation, and third phase hexagonal network tessellation are configured to provide a wireless network for an entire predefined geographic space.

5. The wireless mesh network of claim 1, wherein the third node, first adjacent node, and second adjacent node are configured to cause buffering delays in transmitting packets, thereby preserving spacing between packets.

6. The wireless mesh network of claim 1, wherein a phase representation of the third node is determined by receiving data corresponding to a plurality of adjacent nodes,
determining a third phase representation is a least represented phase representation, among a first phase representation, a second phase representation, and the third phase representation, based on the data corresponding to the plurality of adjacent nodes, and
assigning the third phase representation to the third node.

7. The wireless mesh network of claim 1, wherein the first node is further configured to receive a second phase packet during the second phase and receive a third phase packet during the third phase.

8. The wireless mesh network of claim 1, wherein the second node is further configured to receive a first phase packet during the first phase and receive a third phase packet during the third phase.

9. The wireless mesh network of claim 1, wherein at least one of the first node, second node, third node, first adjacent node, and second adjacent node is solar-powered.

10. A method for synchronizing packet routing within a wireless mesh network, the method comprising:
determining a full-phase x-second long iteration comprising N consecutive, non-overlapping phases including a first phase, a second phase, and a third phase, wherein each of the first, second, and third phases are x/N seconds long;
receiving, via a third node, a first packet transmitted from a first node during the first phase, wherein the first node is configured to transmit only during the first phase, and wherein the first node is configured to receive packets during the second and third phases;
receiving, via a third node, a second packet transmitted from a second node during the second phase, wherein the second node is configured to transmit packets only during the second phase, and wherein the second node is configured to receive packets during the first and third phases;
applying, at a third node during the third phase, an exclusive-or (XOR) operation to the first packet and the second packet to generate a third packet, and
sending, during a third phase, the third packet to a first adjacent node and a second adjacent node, via respective direct links, wherein
the third node is configured to transmit packets only during the third phase, and wherein the third node is configured to receive packets during the first and second phases.

11. The method of claim 10, wherein the first adjacent node is further configured to:
receive, during the second phase, a second phase packet,
receive, during the third phase from the third node, the third packet;
apply an exclusive-or (XOR) operation to the second phase packet and the third packet;
retrieve, as a result of applying the exclusive-or operation, the first packet.

12. The method of claim 10, wherein the second adjacent node is further configured to:
receive, during the first phase, a first phase packet,
receive, during the third phase from the third node, the third packet;
apply an exclusive-or (XOR) operation to the first phase packet and the third packet; and
retrieve, as a result of applying the exclusive-or operation, the second packet.

13. The method of claim 10, wherein the third node is configured to be a center node of a first phase hexagonal network tessellation, the first adjacent node is configured to be a center node of a second phase hexagonal network tessellation, the second adjacent node is configured to be a center node of a third phase hexagonal network tessellation, and the first phase hexagonal network tessellation, second phase hexagonal network tessellation, and third phase hexagonal network tessellation are configured to provide a wireless network for an entire predefined geographic space.

14. The method of claim 10, wherein the third node, first adjacent node, and second adjacent node are configured to cause buffering delays in transmitting packets, thereby preserving spacing between packets.

15. The method of claim 10, wherein a phase representation of the third node is determined by receiving data corresponding to a plurality of adjacent nodes, determining a third phase representation is a least represented phase representation, among a first phase representation, a second phase representation, and the third phase representation, based on the data corresponding to the plurality of adjacent nodes, and assigning the third phase representation to the third node.

16. The method of claim 10, wherein the first node is further configured to receive a second phase packet during the second phase and receive a third phase packet during the third phase.

17. The method of claim 10, wherein the second node is further configured to receive a first phase packet during the first phase and receive a third phase packet during the third phase.

18. The method of claim 10, wherein at least one of the first node, second node, third node, first adjacent node, and second adjacent node is solar-powered.

19. A wireless mesh network comprising:

a phase synchronization module to determine a full-phase x-second long iteration comprising N consecutive, non-overlapping phases including a first phase, a second phase, a third phase, and a fourth phase, wherein each of the first, second, third, and fourth phases are x/N seconds long;

a first node configured to transmit a first packet during the first phase, wherein the first node is configured to transmit only during the first phase, and wherein the first node is configured to receive packets during the second, third, and fourth phases;

a second node configured to transmit a second packet during the second phase, wherein the second node is configured to transmit packets only during the second phase, and wherein the second node is configured to receive packets during the first, third, and fourth phases:

a third node configured to transmit a third packet during the third phase, wherein the third node is configured to transmit packets only during the third phase, and wherein the third node is configured to receive packets during the first, second and fourth phases;

a fourth node configured to:

receive, during the first phase, the first packet from the first node, receive, during the second phase, the second packet from the second node, receive, during the third phase, the third packet from the third node, apply an exclusive-or (XOR) operation to the first packet, the second packet, and the third packet to generate a fourth packet; and send, during the fourth phase, the fourth packet to a first adjacent node, a second adjacent node, and a third adjacent node, wherein the fourth node is configured to transmit packets only during the fourth phase, and wherein the fourth node is configured to receive packets during the first, second, and third phases.

20. The wireless mesh network of claim 19, wherein the first adjacent node is further configured to:

receive, during the second phase, a second phase packet, receive, during the third phase, a third phase packet;

receive, during the fourth phase from the fourth node, the fourth packet;

apply an exclusive-or (XOR) operation to the second phase packet, the third phase packet, and the fourth packet;

retrieve, as a result of applying the exclusive-or operation, the first packet.

* * * * *